United States Patent
Kiessling et al.

(10) Patent No.: US 12,409,751 B2
(45) Date of Patent: *Sep. 9, 2025

(54) REAL-TIME ELECTRIC VEHICLE FLEET MANAGEMENT

(71) Applicant: BP PULSE FLEET NORTH AMERICA INC., Mountain View, CA (US)

(72) Inventors: Thomas Kiessling, Palo Alto, CA (US); Mike Makuch, Austin, TX (US)

(73) Assignee: BP PULSE FLEET NORTH AMERICA, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/542,411

(22) Filed: Dec. 15, 2023

(65) Prior Publication Data

US 2024/0116388 A1    Apr. 11, 2024

Related U.S. Application Data

(63) Continuation of application No. 17/025,895, filed on Sep. 18, 2020, now Pat. No. 11,872,902.

(60) Provisional application No. 62/903,638, filed on Sep. 20, 2019.

(51) Int. Cl.
*B60L 53/62* (2019.01)
*B60L 53/67* (2019.01)

(52) U.S. Cl.
CPC .............. *B60L 53/62* (2019.02); *B60L 53/67* (2019.02); *B60L 2240/72* (2013.01)

(58) Field of Classification Search
CPC ....... B60L 53/62; B60L 53/67; B60L 2240/72
USPC ......................................................... 700/297
See application file for complete search history.

(56) References Cited

U.S. PATENT DOCUMENTS

| | | | |
|---|---|---|---|
| 6,826,460 B2 | 11/2004 | Kittell et al. | |
| 8,725,306 B2 | 5/2014 | Ramezani et al. | |
| 9,112,382 B2 | 8/2015 | Paul et al. | |
| 9,964,415 B2* | 5/2018 | Ricci .................. | G01C 21/3673 |
| 2012/0245750 A1 | 9/2012 | Paul et al. | |
| 2012/0330494 A1 | 12/2012 | Hendrix et al. | |
| 2014/0129040 A1* | 5/2014 | Emadi .................... | G06Q 50/06 700/291 |
| 2015/0317589 A1 | 11/2015 | Anderson et al. | |
| 2017/0305273 A1 | 10/2017 | Korenaga et al. | |
| 2019/0359065 A1* | 11/2019 | Al-Awami ............. | G05B 15/02 |
| 2020/0023747 A1* | 1/2020 | Logvinov ............... | B60L 55/00 |

(Continued)

OTHER PUBLICATIONS

Extended European Search Report, mailed Sep. 13, 2023 for EP Application No. 20865756.9.

(Continued)

*Primary Examiner* — Md Azad
(74) *Attorney, Agent, or Firm* — Dorsey & Whitney LLP

(57) ABSTRACT

The present disclosure provides methods, systems, and devices for controlling electric vehicle charging across multiple customers and multiple fleets of electric vehicles. These methods, systems, and devices may implement machine learning to determine distinct charging strategies for a plurality of charging depots. Scheduling methods systems, and devices disclosed herein do not require fixed electric vehicle arrival times but may instead update charging strategies in real time based on changes in a state of a system.

20 Claims, 9 Drawing Sheets

(56) References Cited

U.S. PATENT DOCUMENTS

| | | | |
|---|---|---|---|
| 2020/0254897 A1* | 8/2020 | Loghavi | B60L 53/67 |
| 2021/0221247 A1* | 7/2021 | Daniel | B60L 53/68 |
| 2022/0122011 A1* | 4/2022 | Islam | G05B 13/0265 |

OTHER PUBLICATIONS

International Search Report and Written Opinion of PCT/US2020/051622, mailed Dec. 4, 2020.
Acuna, George Alfons Wenzel, "Real-Time Strategies for an Electric Vehicle Aggregator to Provide Ancillary Services", Aug. 2016.
Moehle, Nicholas, et al., "Dynamic Energy Management", Mar. 14, 2019.

\* cited by examiner

REAL-TIME ELECTRIC VEHICLE FLEET MANAGEMENT

CROSS-REFERENCE TO RELATED APPLICATION

This application is a continuation of U.S. patent application Ser. No. 17/025,895, filed 18 Sep. 2020, which claims priority to and the benefit of U.S. Provisional Patent Application No. 62/903,638, filed 20 Sep. 2019, both of which are hereby incorporated by reference in their entireties.

BACKGROUND

High penetration of renewable energy sources has led to increased electrical grid volatility due to the intermittent nature of certain renewable energy sources. Systems are needed to stabilize the grid in response to increasing or decreasing load.

SUMMARY

The present disclosure provides methods, systems, and devices for scheduling electric vehicle charging across multiple customers and multiple fleets of electric vehicles. These methods, systems, and devices incorporate many parameters to lower the cost of electric vehicle fleet charging. Such parameters may include schedule and charge requirements of each vehicle in a fleet of electric vehicles, cost of energy and charging depot infrastructure, utility power meter control, and revenue from vehicle to grid discharging to power ancillary services. As described herein, the methods, systems, and devices of this disclosure may update charging schedules in real time and may not require fixed electric vehicle arrival times when defining a charging method plan.

The methods, systems, and devices disclosed herein enable distinct charging strategies for a plurality of charging depots, providing flexibility to the depot and fleet operators. Machine learning may be implemented to increase efficiency of cross-depot scheduling based on correlation between charging depots, charging metrics, and cost of power due to electrical grid supply and demand.

In some aspects, the present disclosure provides a computer implemented method for managing an electric vehicle fleet, the method comprising: receiving notification of an arrival of a vehicle at a charging station; identifying a customer vehicle fleet to which the vehicle belongs, wherein the customer vehicle fleet comprises one or more charging metrics; generating a charging method plan for the vehicle based on the charging metrics of the customer vehicle fleet and data relating to power ancillary services, wherein the charging method plan comprises a charging and discharging schedule for the vehicle; updating the charging schedule for the vehicle at any point during the duty cycle.

Another aspect of the disclosure relates to a computer-implemented method, comprising measuring, total power consumption of a site over time, calculating a consumption trend indicator for the total power consumption, calculating, a consumption variation indicator for the total power consumption, determining, whether the consumption trend indicator is above a trend indicator threshold, determining, whether the consumption variation indicator is above a variation indicator threshold, and determining, a first remaining power value if the consumption trend indicator exceeds the trend indicator threshold or if the consumption variation indicator is above the variation indicator threshold, or determining, a second remaining power value if the consumption trend indicator is below the trend indicator threshold or if the consumption variation indicator is below the variation indicator threshold. The method can also include permitting an electric vehicle charger to consume power at the site at a magnitude less than or equal to the determined first remaining power value or the determined second remaining power value.

In some embodiments, the method can further comprise providing power from the electric vehicle charger to a vehicle at the magnitude. The consumption trend indicator can comprise a rate of change of the total power consumption of the site. The consumption variation indicator can comprise a standard deviation value of the site over time. The first remaining power value can be a maximum value of the total power consumption. The second remaining power value can be a real-time measurement of the total power consumption. The total power consumption can include a first plurality of loads configured to be controlled by the computer and a second plurality of loads uncontrolled by the computer. The total power consumption can include consumption of a first plurality of loads having measured consumption and a second plurality of loads having unmeasured consumption.

In some embodiments, a method is provided that comprises measuring power consumption of a site over a time period, determining a consumption trend indicator for the power consumption during the time period, and determining a charging rate for an electric vehicle at the site based on the consumption trend indicator. The method can further comprise comparing the consumption trend indicator to a trend indicator threshold and determining the charging rate for the electric vehicle based on the comparison of the consumption trend indicator to the trend indicator threshold. The method can also comprise determining a consumption variation indicator for the power consumption and utilizing the consumption variation indicator to determine the charging rate. In some embodiments, the method can comprise comparing the consumption variation indicator to a variation indicator threshold and determining the charging rate of the electric vehicle based on the comparison of the consumption variation indicator to the variation indicator threshold. The method can also comprise providing power from an electric vehicle charger to the electric vehicle at the charging rate. The charging rate can be a difference between a maximum value of the power consumption in the time period and a power consumption threshold or can be a difference between a real-time measurement of the power consumption and a power consumption threshold. The power consumption can include a first plurality of loads configured to be controlled by a computer and a second plurality of loads uncontrolled by the computer.

Another aspect of the present disclosure provides a non-transitory computer readable medium comprising machine executable code that, upon execution by one or more processors, implements any of the methods above or elsewhere herein.

Another aspect of the present disclosure provides a system comprising one or more processors and memory components coupled thereto. The a memory component may include machine executable code that, upon execution by the one or more processors, implements any of the methods above or elsewhere herein. In some embodiments, an electric vehicle charging control system can comprise an electric vehicle charging apparatus positioned at an electrical utility customer site, an electricity consumption sensor for the electrical utility customer site configured to measure total power consumption of the site, and a control system in electronic communication with the electricity consumption sensor. The control system can comprise at least one processor and memory component coupled to the at least one processor, wherein the memory component comprises machine executable code that, upon execution by the at least one computer processor, implements any of the methods indicated above or elsewhere herein.

Yet another aspect of the disclosure relates to a method comprising measuring power consumption of a site over a time period, determining a consumption variation indicator for the power consumption during the time period, and determining a charging rate for an electric vehicle at the site based on the consumption variation indicator. The method can further include comparing the consumption variation indicator to a variation indicator threshold and determining the charging rate based on the comparison of the consumption variation indicator to the variation indicator threshold. Furthermore, the method can comprise determining a consumption trend indicator for the power consumption and utilizing the consumption trend indicator to determine the charging rate. In some embodiments, the method can include comparing the consumption trend indicator to a trend indicator threshold and determining the charging rate of the electric vehicle based on the comparison of the consumption trend indicator to the trend indicator threshold. In some embodiments, the consumption variation indicator can comprise a standard deviation of the power consumption during the time period.

Additional aspects of the disclosure relate to a non-transitory computer-readable storage medium comprising machine executable code that, upon execution by one or more processors, implements the electric vehicle charging control method described above and an electric vehicle charging control system. The EV charging control system can comprise an EV charging apparatus positioned at an electrical utility customer site, an electricity consumption sensor for the electrical utility customer site, with the electricity consumption sensor being configured to measure power consumption of the electrical utility customer site, and a control system in electronic communication with the electricity consumption sensor, wherein the control system can comprise at least one processor and memory coupled to the at least one processor, wherein the memory comprises machine executable code that, upon execution by the at least one processor, implements the method described above.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1:
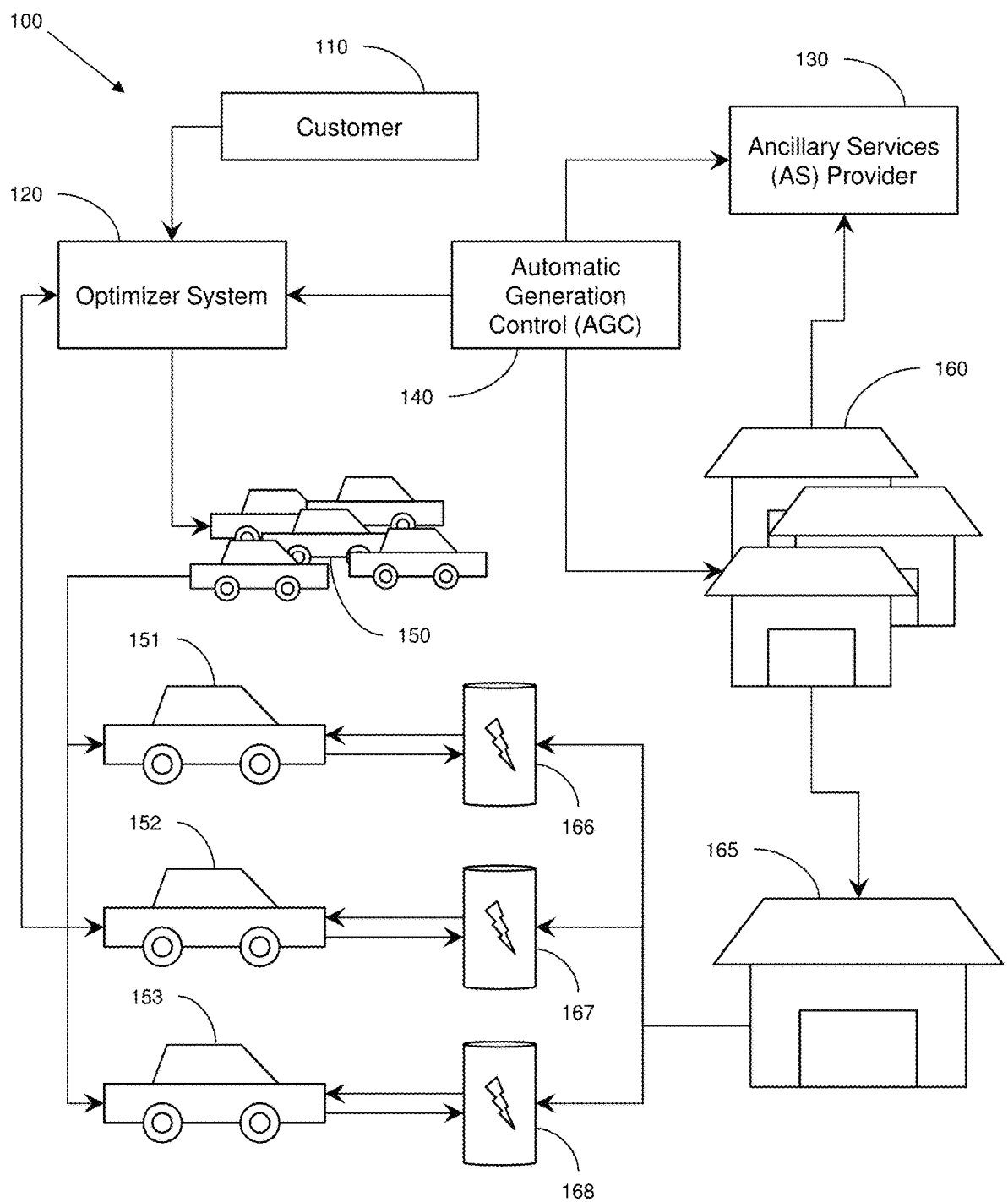
FIG. 1 shows a block diagram illustrating an exemplary system for determining electric vehicle charging strategies based on customer-provided parameters and an automatic generation control signal.

While various embodiments have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The present disclosure provides methods, systems, and devices for determining and improving electric vehicle charging strategies. A charging method plan may comprise ranges of arrival and departure times of electric vehicles at charging stations, power levels during charging, and sequences and relationships of vehicles during charging. A charging method plan may provide for exception events, for example a maintenance event. A charging method plan may incorporate dependencies between a plurality of charging depots. In some embodiments, electric vehicle charging strategies are determined for one or more electric vehicle fleets comprising a plurality of electric vehicles. A charging method plan may be implemented by one or more fleets comprising one or more electric vehicles. For example, a charging method plan may be implemented by a fleet of ride sharing autonomous electric vehicles. The charging method plan may provide guidelines to one or more electric vehicles in the fleet regarding departure times from a charging depot and arrival times to a charging depot. The charging method plan may be used to set one or more charging schedules for one or more electric vehicles. A charging schedule may comprise periods of charging, periods of discharging, power levels or rates of charging, and power levels or rates of discharging.

Distinct charging strategies may be implemented by one or more charging depots comprising one or more charging stations. Implementation of distinct charging strategies may enable customization of a charging method plan to fit a customer's needs, improved grid flexibility and stabilization, and adaptive vehicle schedules that may be updated in response to a change in the customer's needs or in response to an event. In some embodiments, a charging schedule is updated in real time in response to an event or a change in a system state. For example, a charging schedule may be updated as an electric vehicle is plugged into a charging station. A charging schedule may be updated based on an automatic generation control signal (AGC) indicating a state of an electrical grid, for example a system load. The AGC signal may provide a system for adjusting a power output of multiple generators at different power plants in response to changes in load.

A charging method plan may comprise one or more charging schedules for one or more electric vehicles. The one or more charging schedules may comprise charging schedules for vehicles as fast-response vehicles (e.g., vehicles that may be ready to enter service on short notice) and/or vehicles slow-response vehicles (e.g., vehicles that may be charging or discharging for long periods of time). A charging schedule may be updated in response to a change in a charging schedule of an electric vehicle, for example, when an electric vehicle is plugged into a charging station, or a charging electric vehicle is requested to enter service. In some embodiments, a charging method plan may not require fixed arrival times for electric vehicles at charging stations. A charging method plan may be prepared based on input parameters, such as those received from a customer known at the time. An initial charging schedule for one or more electric vehicles may be prepared based on the charging method plan and subsequently updated in real time in response to changes in parameters and system states. A charging method plan may be fleet-based. For example, a charging method plan may be implemented by one or more electric vehicle fleets, one or more charging depots, or one or more customers. A fleet-based charging method plan may coordinate charging schedules between one or more electric vehicles and one or more charging stations to decrease energy costs, increase revenue from vehicle to grid transfer to power ancillary services, or reduce electric vehicle down time.

Machine learning may be used to improve charging strategies. In some embodiments, machine learning may be used to predict one or more current or future parameters. Current or future parameters may be used to determine a charging method plan to, for example, increase gross contribution, increase revenue, decrease cost, increase grid stability and flexibility, and coordinate electric vehicle schedules. Machine learning may be used to coordinate charging strategies or charging schedules between one or more electric vehicles, one or more electric vehicle fleets, or one or more charging depots. For example, machine learning may be used to determine correlation between charging depots, improve charging metrics, predict environmental variables, and increase revenue from vehicle to grid powering of ancillary services (AS). The machine learning system may be, for example, a neural network, a Support Vector Machine Regression, or a Bayesian additive regression tree. The machine learning system may be trained using any of the parameters disclosed herein, for example a vehicle state of charge, a nominal charging trajectory, an AGC signal, a revenue from ancillary services, a power cost, a charging or discharging rate, an environmental signal, a deviation from a state of charge nominal trajectory, an accuracy score, a cost matrix, a gross contribution, or a vehicle schedule. Parameters may be used individually or in any combination. Charging schedules may be updated in real time. In some embodiments, a charging method plan is updated within 0.1 seconds, within 0.2 seconds, within 0.5 seconds, within 1 second, within 2 seconds, within 3 seconds, within 4 seconds, within 5 seconds, within 10 seconds, within 15 seconds, within 20 seconds, within 30 seconds, within 45 seconds, within 60 seconds, within 2 minutes, within 5 minutes, or within 10 minutes of a change in a system state.

The charging strategies and schedules disclosed herein may be implemented in conjunction with various electric vehicles and charging stations. An electric vehicle may comprise an electrical receptacle configured to receive an electrical connector for recharging or discharging an electric vehicle and one or more batteries configured to store and release electric charge. A charging station may comprise an electric power line connecting the receptacle to a local power grid (or other power source) and configured to transmit electrical charge; a control device on the electric power line, for regulating the direction and rate of current flow; a current measuring device on the electric power line, for measuring current flowing through the receptacle; a controller configured to operate the control device and to monitor the output from the current measuring device; and a communication device connected to the controller, the communication device being configured to connect the controller to a communication device, for communication between a customer, the electric vehicle, an optimizer system, and the controller.

An electric vehicle fleet may comprise a plurality of electric vehicles and means to communicate between one or more of the plurality of electric vehicles, the customer, one or more charging stations, or the optimizer system. A customer may own or control one or more electric vehicle fleets or one or more charging depots. A charging depot may comprise a plurality of charging stations and a networking device, the networking device in communication with one or more of the plurality of charging stations, the electrical grid, or the optimizer system. The optimizer system may comprise one or more communication networks configured to communicate between one or more of an electric vehicle, a customer, a charging station, a charging depot, the electrical grid, or an ancillary service provider. The communication network may comprise one or more of a local area network, a mobile network, a radio frequency identification transmitter, a wireless personal area network, a wireless local area network, power line communication technology, or a wide area network. An electric vehicle, a customer, a charging station, a charging depot, the electrical grid, or an ancillary service provider may be equipped to send or receive signals from the communication network.

In embodiments, a dynamic charging method is disclosed that varies the changing power or charging rate of an electric vehicle based on one or more variables, to help ensure that the consumption of power during the charging time does not exceed a threshold, such as a pricing threshold for the power usage. In particular, typical power charging methods for electric vehicles may not be able to account for variations in power load for the charging station that are not actively monitored or captured within the charging stations themselves, e.g., power loads due to lighting, air-conditioning, and other non-vehicle related consuming devices that may be present and draw power from the same power source as the charging station at the charging depot. Often these non-vehicle related draws may be difficult to predict and unknown to the charging algorithms for the vehicles themselves. However, such draws may adversely and substantially impact the overall power usage of a charging depot.

In one example, an overall power consumption rate of change of the site can be used to make determinations as to the charging or power draw rate for one or more electric vehicles. In instances where the power consumption rate is increasing (e.g., a positive-sloped trend), the vehicle charging rates may be reduced, even if the overall consumption average may be below a desired threshold. This reductions can help to ensure that the overall consumption for a time period of the charging depot does not exceed a threshold, and can provide a gap that can account for non-vehicle related power consuming devices. Additionally or alternatively, a standard deviation or other historical comparison value may be used to predict and update the charging rates for the vehicles. For example, if a current power consumption average total value exceeds by a threshold one or more historical values, such as exceeding a previous standard deviation of average power consumption, the vehicle charging rates may be reduced, even when the overall power consumption rate for the depot is trending downward (e.g., the recent power consumption has a negatively sloped trend). Furthermore, an optimization system can determine a variance or variation indicator for the consumption of the site, wherein the charging method plan for the EV charger can be adjusted based on whether the total consumption of the site has high or low deviation from recent consumption. In this manner, the charging rates for the vehicles can be reduced to account for changes in consumption by non-vehicle consuming devices.

FIG. 1 illustrates a system 100 for providing charging method plans for one or more fleets comprising a plurality of electric vehicles or one or more charging depots comprising one or more charging stations. One or more charging schedules may be determined based on the charging strategies, and the charging schedules may be updated in real time (e.g., dynamically) based on changes in system states. In some embodiments, a customer 110 provides fleet parameters or depot parameters to the optimizer system 120. These parameters may include fleet size and composition; predicted vehicle usage schedules and locations; desired duty cycle; vehicle types, charge capacities, and ranges; vehicle target states of charge; number of charging stations; capacity of charging stations; total power consumed by the site (e.g., the total power used by controlled and uncontrolled loads powered by the site); available power for charging at the site; or maximum power load of the site or its charging stations. The optimizer system may provide a charging method plan to a fleet 150 based on the parameters provided by the customer, predicted environmental variables, time-dependent cost of energy, power-consumption-magnitude-dependent cost of energy or power, and predicted revenue from vehicle to grid (V2G) discharging. The charging method plan may be generated based on any combination of factors, including parameters provided by the customer, predicted environmental variables, predicted future power or energy consumption, current or historical power or energy consumption, time-dependent cost of energy, and predicted revenue from vehicle to grid (V2G) discharging. Different factors may be assigned different weights. In some embodiments, the customer may provide input to the system that can be used to determine the factors or weights assigned to different factors, e.g., provide user preferences for certain factors. In some embodiments, the factors, or the weights assigned to different factors may be determined by the optimizer system. The factors, or the weights assigned to different factors may be customized for each customer or may be the same for two or more customers or charging depot locations. In some embodiments, the customer may select the factors, or the weights assigned to different factors based on a predetermined selection of charging categories or charging strategies. The charging method plan may be communicated to a plurality of electric vehicles in the fleet, for example a first electric vehicle 151, a second electric vehicle 152, a third electric vehicle 153, or more electric vehicles. The charging strategies may be communicated to one or more charging depots 160. Each charging depot 165 may implement a distinct charging method plan.

The charging method plan may or may not comprise fixed arrival times for electric vehicles at a charging station. The charging method plan may accommodate vehicle arrivals without requiring advanced scheduling. The charging method plan may comprise one or more charging schedules (e.g., plans for managing power consumption (or generation/discharging) at the site that is caused by connection of an electric vehicle to the site). In some embodiments, a charging schedule may be updated when a vehicle is plugged into a charging station at a charging depot. For example, when a first electric vehicle is plugged into a first charging station 166, a second electric vehicle is plugged into a second charging station 167, a third electric vehicle plugged into a third charging station 168, or more electric vehicles plugged into more charging stations. The charging stations (i.e., charging apparatuses or electric vehicle supply equipment (EVSE)) may be at a charging depot 165. The electric vehicle plugged into the charging station may provide parameters to the optimizer system. These parameters may include, state of charge, rate of charge, target state of charge, and predicted duration at charging station. The optimizer system may update the charging schedule based on the parameters. In some embodiments, a charging schedule may be updated when a vehicle is driving, arriving at a charging station, connected to the charging station, or leaving a charging depot.

In some embodiments, an electricity consumption sensor or meter for the utility customer site having a charging station can be used to measure the total power consumption of electricity at the site. For example, an electrical utility power meter can be used at the site to track and measure the total consumption of electricity at the site from the electrical utility grid, wherein such total may include both vehicle and non-vehicle power consuming sources. One or more power meters or sensors (e.g., an electromechanical or electronic meter for measuring ampere-hours, rate of electricity usage, time-of-usage, voltage, and related quantities) can be used to track consumption of power from the grid, local energy storage and generation, or other sources of power. The electricity consumption sensor can be in electrical communication with the optimizer system 120 to provide measurements of power or energy used at the site over time. The total power consumption can include consumption from loads that are monitored or measured, loads that are unmonitored or unmeasured, controlled or controllable loads (i.e., loads that have (or can have) their consumption changed (i.e., increased or decreased in response to a command instruction) by the optimizer system 120 or a user or beneficiary thereof), and uncontrolled or uncontrollable loads (i.e., loads that are not (or cannot) have their consumption changed by the optimizer system 120 or a user or beneficiary thereof). In some embodiments, a mix of controlled, uncontrolled, monitored, and unmonitored loads are positioned at the charging depot 165 or other customer site having an EV charging station, and the operator or optimizer system 120 may therefore be unable to determine the amount of available power for consumption by EV charging in real time. These various load factors can also make it significantly more difficult to anticipate and predict future consumption at the site.

The optimizer system may also receive an automatic generation control (AGC) signal 140 indicating a state of an electrical grid. For example, the AGC signal may provide a system load of an electrical grid. The AGC signal may depend on power supply and demand and may be indicative of grid stability. The AGC signal may be used by the optimizer system to predict energy costs. The AGC signal may be used by charging depots 160 to determine revenue potentials of ancillary grid services 130, and to determine opportunity costs of not charging vehicles, due to an AGC signal, which might lead to revenue loss due to missed charging contractual obligations or to additional costs due to expensive charging at a different time slot. For example, the AGC signal may be used to schedule times for discharging to increase revenue from ancillary grid services, times for charging to decrease expenses from time-dependent energy costs, or times for not charging to decrease revenue loss due to deviations from contractual state of charge. Individual depots implementing distinct charging strategies may respond to uncertain AGC signals to improve grid stabilization and utilization. The AGC signal may be predicted based on previous AGC signals or other previous parameters, for example using machine learning.

The optimizer system may utilize bidirectional charging efficiency to increase efficiency of charging schedules. While plugged into a charging station, an electric vehicle may be charging (e.g., storing energy into a battery) or discharging (e.g., providing energy to an ancillary service provider). The optimizer system may instruct an electric vehicle to charge based on an AGC signal indicating system load. In some embodiments, the optimizer system may provide instructions to the electric vehicle to charge while system load is low and energy costs are low. In some embodiments, the optimizer system may provide instructions to the electric vehicle to discharge when system load is high and energy costs are high. Discharging while energy costs are high may increase revenue to a fleet charging operator by selling energy to ancillary service providers at times of high demand. Bidirectional charging efficiency may be determined by any method known in the art. For example, bidirectional charging efficiency may be determined by a method as described in "Real-Time Strategies for an Electric Vehicle Aggregator to Provide Ancillary Services," Wenzel Acuña, 2016, which is incorporated by reference in its entirety.

Figure 2:
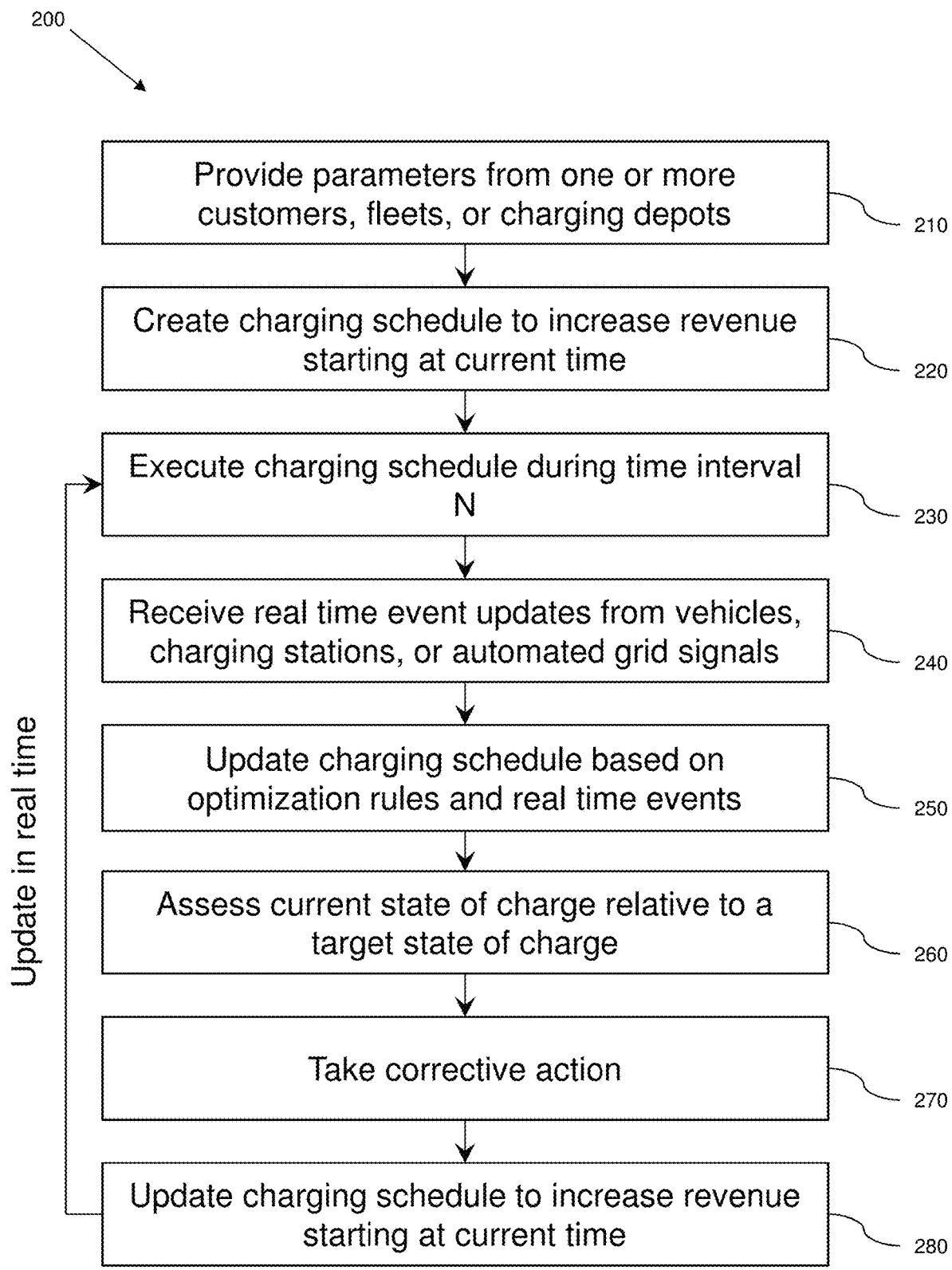
FIG. 2 shows a flow chart illustrating an exemplary process for dynamically varying a charging method plan for one or more electric vehicle fleets.

FIG. 2 shows a method 200 for providing, provisioning, operating and continuously updating charging strategies and charging schedules for one or more customers, one or more electric vehicle fleets, at one or more charging depots. A distinct charging method plan may be prepared for each electric vehicle fleet (e.g., 150) or each charging depot (e.g., 165). Utilization of distinct charging strategies may enable adjustment of each distinct charging method plan to fulfill the customer's preferences, for example, by satisfying a customer's preferred duty cycle or charging schedule or to respond to promote grid stabilization in response to uncertain AGC signals. Preferences may be used individually or in any combination. In some embodiments, a charging method plan may be based on a first-in, first-out (FIFO) model or fixed schedule charging model. A FIFO model may comprise immediate charging with a committed maximum time to achieve a full charge or arrival at a stochastic distribution rate. A vehicle charging schedule may be prepared based on a charging method plan, as described herein.

At process 210, a customer provides fleet parameters and preferred duty cycles to the optimizer system. Fleet parameters may include a number of vehicles, types of vehicles, target states of charge, vehicle duty cycles, vehicle ranges, vehicle battery sizes, a number and availability status of parking stations, power output limits of charging stations, and other parameters. A vehicle duty cycle may include a vehicle use schedule, an arrival time at a charging station, or a duration of stay at the charging station. A charging schedule may be created at step 220 for an electric vehicle based on the charging method plan and the customer-provided parameters at the current time. The charging schedule may be prepared to increase revenue or decrease costs to the customer.

At step 230, the one or more fleets or one or more charging depots may execute a charging schedule during a time interval N. A distinct charging schedule may be executed for each electric vehicle in each electric vehicle fleet. The charging schedule may be based on a charging method plan for the electric vehicle fleet to which the electric vehicle belongs or the charging depot at which the vehicle is plugged in. The charging schedule may be updated based on updates to customer-provided parameters or real time event updates.

At step 240, the optimizer system may receive real time event updates from one or more electric vehicles, one or more charging stations, or an automated grid signal. An event update from an electric vehicle may comprise information, for example a state of charge of the vehicle, an entry time at the charging station, a predicted duration of stay at the charging station, and a target state of charge. An event update from an electric vehicle may further comprise telematics information, for example location, movements, status, or behavior of a vehicle or fleet of electric vehicles. An event update from a charging station may comprise arrival or departure of an electric vehicle, a state of charge of the electric vehicle, a charging rate, a power output limit, and power metrics. An event update from an automated grid signal may include an Automatic Generation Control (AGC) signal. The AGC signal may be predicted, for example, by machine learning using a trained model of AGC signals. In some embodiments, a model of AGC signals may be predicted as a function of time. The AGC signal may be predicted by detecting an AGC signal in real time. For example, the AGC signal may be detected within 0.1 seconds, within 0.2 seconds, within 0.5 seconds, within 1 second, within 2 seconds, within 3 seconds, within 4 seconds, within 5 seconds, within 10 seconds, within 15 seconds, within 20 seconds, within 30 seconds, within 45 seconds, within 60 seconds, within 2 minutes, within 5 minutes, or within 10 minutes of a change in AGC signal. The AGC signal is determined by any method known in the art. For example, the AGC signal may be determined using the method described in "Dynamic Energy Management," Nicholas Moehle et al., 2018, which is incorporated by reference in its entirety.

The real time updates received at step 240 may be used to apply optimization rules at step 250. For example, the optimizer system may receive a real time update indicating that a charging station is in fault state. The optimizer system may detect a state of charge of an electric vehicle plugged into the faulty charging station and determine a deviation from a target state of charge. In some cases, an optimization rule engine may assess the deviation from the target state of charge and a risk of a high severity incident (e.g., an incident that may lead to expensive repair or service costs) to determine whether to remove the faulty charging station from service, plug the electric vehicle into a different charging station, request service of the faulty charging station at a later time (e.g., the next morning), or a combination thereof. For example, if a deviation from a target state of charge is low, the faulty charging station may be removed from service and the electric vehicle may be unplugged from the faulty charging station. For example, if the risk of a high severity incident due to unplugging the electric vehicle is high, service on the faulty charging station may be postponed, and the electric vehicle may remain plugged in to the faulty charging station.

At step 260, the optimizer system may assess a current state of charge of one or more electric vehicles. The optimizer system may compare the current state of charge to a target state of charge or a predicted state of charge. The optimizer system may determine if action should be taken to correct for a discrepancy between a current state of charge, a target state of charge, or a predicted state of charge. The optimizer system may provide an instruction to take a corrective action at step 270. For example, the optimizer system may instruct a charging depot to restart a charger. Steps 260, 270, and 280 may be performed in any order. In some cases, steps 260, 270, and 280 may occur simultaneously.

The charging schedules for one or more electric vehicles may be updated at step 280. The charging schedules may be updated based on real time event updates or updates to input parameters including the states of one or more electric vehicles plugged into one or more charging stations, the AGC signal, the ancillary service energy market demand, improved grid stabilization and utilization, or increased gross contribution. Parameters may be used individually or in any combination. Updates to gross contribution are described in further detail with respect to FIG. 3. These inputs may be updated in real time. Charging schedules may be updated in real time, for example in response to changes in one or more of the input parameters. The charging strategies may be updated within 0.1 seconds, within 0.2 seconds, within 0.5 seconds, within 1 second, within 2 seconds, within 3 seconds, within 4 seconds, within 5 seconds, within 10 seconds, within 15 seconds, within 20 seconds, within 30 seconds, within 45 seconds, within 60 seconds, within 2 minutes, within 5 minutes, or within 10 minutes of a change in an input parameter.

Fleet-based charging strategies may be implemented by one or more electric vehicle fleets, one or more charging depots, or one or more electrical utility customers. Such fleet-based charging strategies may coordinate charging schedules between one or more electric vehicles and one or more charging stations to decrease energy costs, increase revenue from vehicle to grid transfer to power ancillary services, and reduce electric vehicle down time. In some embodiments, fleet-based strategies may improve electrical grid stability through coordinated charging and discharging based on electrical supply and demand. In some embodiments, fleet-based charging strategies may decrease electric vehicle response time, such as decreasing a time between directing an electric vehicle to enter service and the electric vehicle entering service. A fleet-based charging method plan may designate some vehicles as fast-response vehicles (e.g., vehicles that may be ready to enter service on short notice) or slow-response vehicles (e.g., vehicles that may be charging or discharging for long periods of time). Fast-response vehicles may have a charging schedule configured to charge rapidly over a short period of time such that the vehicle has a high state of charge if directed to enter service. For example, a fast-response vehicle may be a ride-sharing vehicle that may respond quickly if a ride is requested. Slow-response vehicles may have a charging schedule configured to provide grid stability or reduce charging costs by charging slowly or discharging to the grid during periods of high demand. For example, a slow response vehicle may be a commuting vehicle that is parked for extended periods of time, such as overnight or during business hours.

A fleet-based charging method plan may be implemented when an electric vehicle is plugged into a charging station. For example, implementing the fleet-based charging method plan may comprise identifying the electric vehicle, identifying the fleet or customer to which the electric vehicle belongs, determining a charging schedule based on the charging method plan, updating the charging method plan based on changes in a state of a system, and charging or discharging the electric vehicle at the rates designated by the charging method plan. Identifying the electric vehicle may comprise sending a signal from the electric vehicle to the optimizer system or the charging depot. Identifying the fleet or customer may comprise sending a signal from the optimizer system to a fleet, a customer, or a charging depot, or receiving a signal from the fleet, the customer, or the charging depot. A signal may be sent over a network, as described elsewhere herein.

Figure 3:
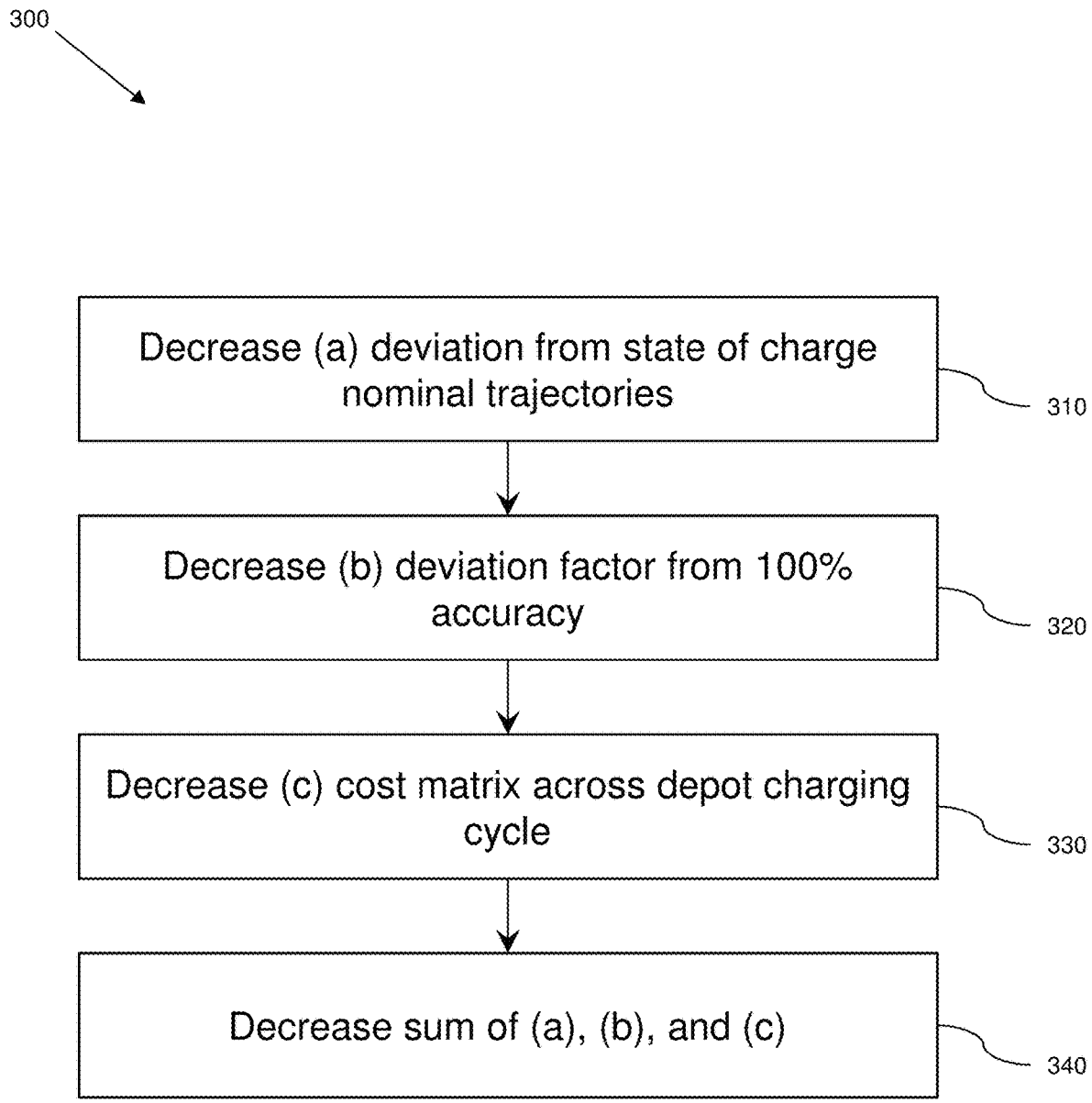
FIG. 3 shows a flow chart illustrating an exemplary process to increase gross contribution for one or more electric vehicle fleets as illustrated in FIG. 2.

FIG. 3 shows a method 300 for increasing gross contribution based on, for example, detected vehicle parameters, customer-provided parameters, or predicted parameters. Parameters, including vehicle parameters, customer-provided parameters, or predicted parameters, may be updated in real time. Using the predicted AGC signal and the real-time ancillary service energy market demand, the optimizer system may update one or more charging schedules to improve energy grid stabilization and utilization. The optimizer system may update the charging schedules to increase a gross contribution to a charging operator. For example, the optimizer system may update the charging schedules to increase a revenue from selling energy to an ancillary service provider and to decrease a cost of power to charge one or more electric vehicles. Determination of gross contribution may utilize detected vehicle parameters, customer-provided parameters, or predicted parameters. Detected vehicle parameters may include vehicle states of charge, vehicle entry times at charging stations, predicted durations of stay at the charging stations, and target states of charge. Customer-provided parameters may include fleet vehicle compositions, nominal state of charge trajectories for one or more electric vehicles, predicted vehicle schedules, predicted states of charge, predicted vehicle locations, and predicted vehicle travel distances. Predicted parameters may include an AGC signal and a market demand for ancillary service energy. The gross contribution may be increased using linear (convex) optimization plus model predictive control (MPC) to predict AGC stabilization signals of the energy grid. The gross contribution may be increased by reducing one or more of (a) a deviation from vehicle state of charge (SOC) nominal trajectories 310, (b) deviation from 100% accuracy in responding to grid signals 320, (c) a cost matrix across depot charging cycles 330, or by reducing a sum of (a), (b), and (c) 340. A gross contribution may be reduced by reducing (a), (b), or (c), or the sum of any combination of (a), (b), or (c). In some embodiments, the gross contribution (GC) may be increased when the following conditions are true:

$$GC = \min \Sigma \alpha_1 |(\text{Optimal } SOC \text{ trajectory} - \text{actual } SOC)| + \alpha_2 |e| + \alpha_3 |(P)(c)|$$

Where $\alpha_1$, $\alpha_2$, and $\alpha_3$ are feasibility factors, e is the deviation from 100% accuracy, P is the amount of power delivered to one or more electric vehicles, and c is the power cost. The sum in the GC function may be iterated over j in range(n), for i in range(v), for d in range(D), where v is the number of vehicles associated with a depot (d), n is the number of time intervals over which GC is determined. In some embodiments, increasing gross contribution considers dependencies between charging depots.

In some embodiments, increasing deviation from vehicle state of charge nominal trajectories may increase payment received from an ancillary service provider. Receipt of payment from the ancillary service provider may comprise delivering one or more committed state of charge schedules to the fleet customer, delivering power from one or more electric vehicles to the ancillary service provider, and securing payment from the ancillary service provider for power provided minus penalties for deviations from vehicle state of charge nominal trajectories. Payment received from the ancillary service provider may be a function of accuracy. Accuracy may reflect an accuracy of a regulation resource in response to the Regional Transmission Organization's (RTO) dispatch signal.

Decrease the cost matrix (C) may comprise decreasing:

$$C = c[[P[i,j] \cdot c[j] \text{ for } j \text{ in range}(n)] \text{ for } i \text{ in range}(v)]$$

where P is the amount of power delivered to one or more electric vehicles, c is the power cost, v is the number of vehicles, n is the number of time intervals.

In some embodiments, the optimizer system may apply constraints when determining one or more charging strategies. For example, the optimizer system may assume a fixed charging method plan at a charging depot. For example, the optimizer system may assume a fixed tariff schedule at a charging depot. In some embodiments, the one or more charging strategies are constrained by charging and discharging constraints, such that:

$$P_k^c \cdot P_k^d = 0$$

wherein P is the amount of power delivered to or from one or more electric vehicles, $P_k^c$ is the power level at time step k, in the case the vehicle charges, and $P_k^d$ is the power level at time step k, in the case the vehicle charges. In some embodiments, the optimizer system is constrained by an absolute limit of power available in the depot, based on switchgear limits of panels and subpanels. The optimizer system may be constrained by a provisioned maximum amount of power per charging depot. The optimizer system may be constrained by charging station maximum power levers. In some embodiments, the optimizer system may be constrained by electric vehicle battery boundaries.

A gross contribution may be determined or predicted when a vehicle is plugged into a charging station. The gross contribution may be updated in response to, for example, a change in AGC signal, a change in electrical grid load, a change in power cost, a change in tariff schedule, a change in state of charge of an electric vehicle, a deviation from a predicted state of charge, or a deviation from 100% accuracy. Some of these values can be entered, detected, or retrieved by a user or processor with access to information from a utility provider or database that makes available pricing, tariffs, charges, and other related information. The gross contribution may be updated in response to any parameter individually or in any combination. The gross contribution may be updated in real time. The gross contribution may be updated using linear (convex) optimization plus model predictive control (MPC) to predict AGC stabilization signals of the energy grid.

Figure 4:
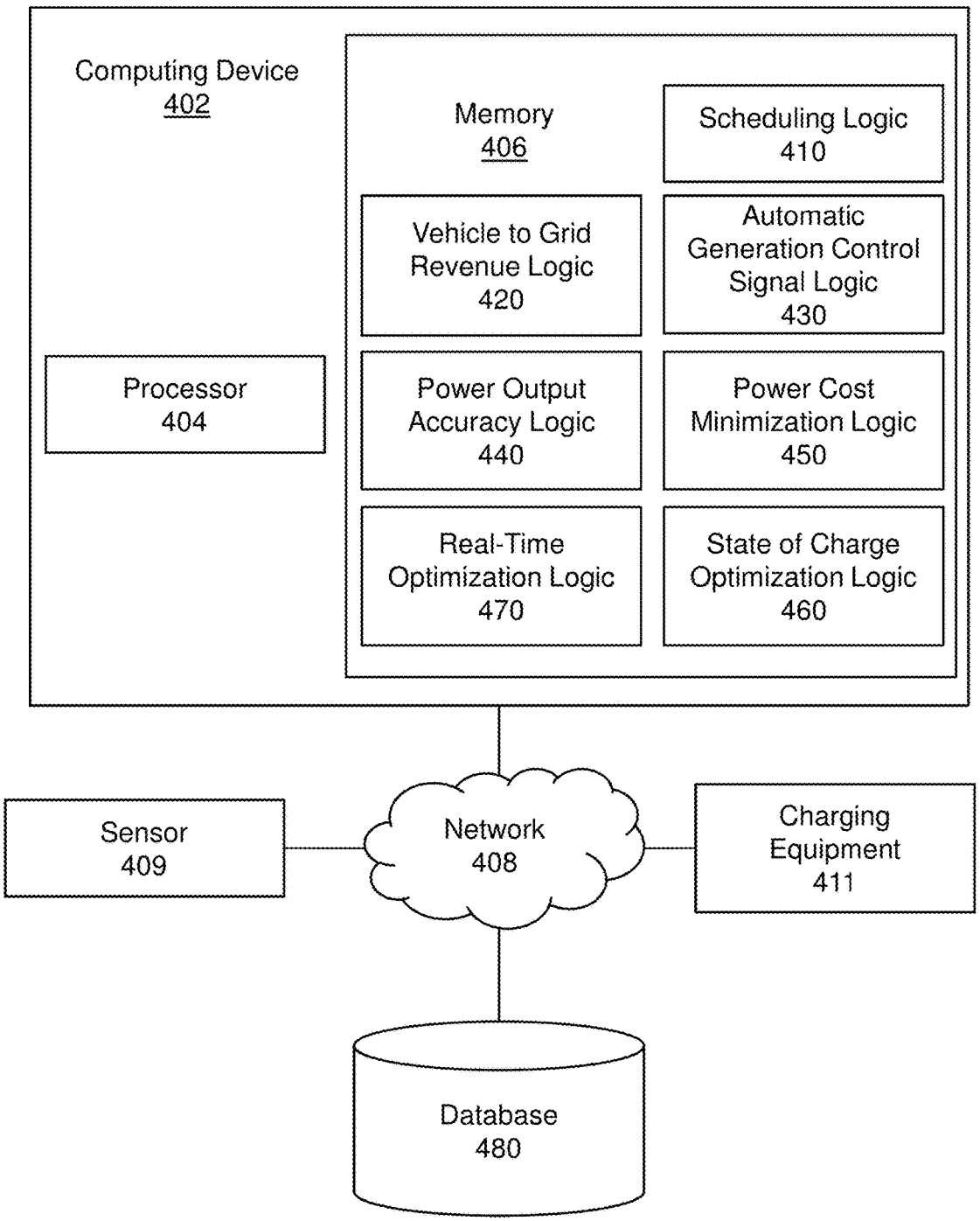
FIG. 4 shows a block diagram illustrating an exemplary computer control system programmed or otherwise controlled to implement the methods or systems provided herein.

FIG. 4 shows a simplified block diagram of an exemplary control system 400 that may be used to implement the methods described herein. The computer control system may implement an optimization system as described herein. The computer control system 400 can include a computing device 402 having a processor 404 and memory 406 (i.e., a memory device) in electronic communication with each other. The system 400 can also include a data store or database 480 connected to the computing device 402 directly or via a network 408. A sensor 409 (e.g., a power or energy consumption sensor or meter for tracking power usage or energy consumption over time, as described elsewhere herein) can also be connected to the other components in the system 400. While a single sensor is shown in FIG. 4, any number may be used. Charging equipment 411 (e.g., EV charging devices and controllers thereof described elsewhere herein) can also be connected to the system 400. The computer control system 400 may have memory 406 that includes (e.g., may be encoded with) executable instructions for optimization and control of charging electric vehicles and managing electricity costs of the site. The memory 406 can therefore comprise a scheduling logic 410 configured to determine one or more charging strategies for one or more electric vehicle fleets and one or more charging depots. A vehicle to grid revenue logic 420 may be configured to increase revenue received from ancillary service providers from providing power to the ancillary service providers. The automatic generation control signal logic 430 may be configured to detect or predict an AGC signal. The power output accuracy logic 440 may be configured to adjust a charging method plan to increase power output accuracy or to approach 100% accuracy. The power cost minimization logic 450 may be configured to adjust a charging method plan to decrease the deviation of an actual state of charge trajectory from the state of charge nominal trajectory. The state of charge optimization logic may be configured to adjust a charging method plan based on a target state of charge, a state of charge nominal trajectory, an initial state of charge, a predicted state of charge, or any combination thereof. The real-time optimization logic 470 may be configured to update one or more charging schedules in real time, for example, in response to one or more state changes or in response to a change in signal from one or more of the scheduling logic, the vehicle to grid revenue logic, automatic generation control signal logic, power output accuracy logic, power cost minimization logic, or state of charge optimization logic. The real-time optimization logic may update one or more charging schedules within 0.1 seconds, within 0.2 seconds, within 0.5 seconds, within 1 second, within 2 seconds, within 3 seconds, within 4 seconds, within 5 seconds, within 10 seconds, within 15 seconds, within 20 seconds, within 30 seconds, within 45 seconds, within 60 seconds, within 2 minutes, within 5 minutes, or within 10 minutes of a state change or a change in signal. It should be understood that system 400 shown in FIG. 4 is an example of one suitable architecture for implementing certain aspects of the present disclosure. Additional, fewer, and/or different components may be used in other examples. It should be noted that implementations of the present disclosure are equally applicable to other types of devices such as mobile computing devices and devices accepting gesture, touch, and/or voice input. Any and all such variations, and any combination thereof, are contemplated to be within the scope of implementations of the present disclosure. Further, although illustrated as separate components of computing device 402, any number of components can be used to perform the functionality described herein. Although illustrated as being a part of computing device 402, the components can be distributed via any number of devices. For example, processor 404 can be provided via one device, sever, or cluster of servers, while memory 406 may be provided via another device, server, or cluster of servers.

One or more of the scheduling logic, the vehicle to grid revenue logic, automatic generation control signal logic, power output accuracy logic, power cost minimization logic, state of charge optimization logic, or real-time optimization logic may use machine learning to predict or improve parameters based on for example, known parameters, previously determined or provided parameters, relationships between elements (e.g., between charging depots or electric vehicles), or environmental variables. One or more of the scheduling logic, the vehicle to grid revenue logic, automatic generation control signal logic, power output accuracy logic, power cost minimization logic, state of charge optimization logic, or real-time optimization logic may use parameters stored in the database 480 or may store determined or improved parameters in the database.

The optimizer system may utilize machine learning to predict parameters used to determine a charging method plan. For example, machine learning may be used to predict an AGC signal, a power cost, an environmental signal, vehicle duration of stay, rate of charging or discharging, vehicle state of charge, or a nominal state of charge trajectory. Machine learning may utilize forecasting modules, for example, one or more of one or more of Support Vector Machine Regression, neural networks, or Bayesian additive regression trees. Previous values for any parameters, for example the AGC signal, the power cost, the environmental signal, the vehicle duration of stay, the rate of charging or discharging, the vehicle state of charge, the nominal state of charge trajectory, or any other measured or provided parameter, may be stored in the database and used to train a machine learning system, such as a neural network, to predict a current or future parameter. A predicted parameter may be time-dependent, for example depending on a time of day, a day of the week, or a season of the year. In some embodiments, the machine learning systems described herein may be used to set weights of parameters when determining a charging method plan.

The computing device 402 of the control system 400 may, in some examples, be integrated with one or more sensors (e.g., 409) and/or one or more pieces of charging equipment (e.g., 411) described herein. Computing device 402 may further be centralized, e.g., not integrated with one or more sensors and/or one or more generators described herein. In some examples, computing device 402 may be implemented using one or more computers, servers, smart phones, smart devices, or tablets. Computing device 402 may facilitate improved charging system optimization and charging control. Computing device 402 may include non-transitory computer-readable media encoded with executable instructions and a processor (e.g., 404) that may execute the instructions to provide for electric vehicle charging optimization and control. The control system 400 includes a processor 404/central processing unit (CPU, also "processor" and "computer processor" herein), which can be a single core or multi core processor, or a plurality of processors for parallel processing. Any kind and/or number of processor may be present, including one or more central processing unit(s) (CPUs), graphics processing units (GPUs), other computer processors, mobile processors, digital signal processors (DSPs), microprocessors, computer chips, and/or processing units configured to execute machine-language instructions and process data. The computer system also includes memory 406 or a memory location (e.g., random-access memory, read-only memory, flash memory) and can further include an electronic storage unit (e.g., hard disk), a communication interface (e.g., a network adapter) for communicating with one or more other systems or components connected to the network 408, and peripheral devices, such as a cache, other memory, data storage and/or electronic display adapters. Any type or kind of memory may be present (e.g., read-only memory (ROM), random access memory (RAM), solid state drive (SSD), and secure digital card (SD card). While a single box is depicted as memory 406, any number of memory devices may be present. The memory 406 may be in communication with (e.g., electrically connected to) processor 404. The memory, storage unit, interface and peripheral devices are in communication with the processor through a communication bus (solid lines), such as a motherboard. The storage unit can be a data storage unit (or data repository) for storing data. The computer system can be operatively coupled to a computer network ("network") with the aid of the communication interface. The network 408 can be the Internet, an internet and/or extranet, or an intranet and/or extranet that is in communication with the Internet. The network, in some cases, is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

The processor (i.e., CPU) can execute a sequence of machine-readable instructions, which can be embodied in a program or software. The instructions may be stored in a memory location, such as the memory. The instructions can be directed to the CPU, which can subsequently program or otherwise configure the CPU to implement methods of the present disclosure. Examples of operations performed by the CPU can include fetch, decode, execute, and writeback. The CPU can be part of a circuit, such as an integrated circuit. One or more other components of the system can be included in the circuit. In some cases, the circuit is an application specific integrated circuit (ASIC).

The storage unit can store files, such as drivers, libraries and saved programs. The storage unit can store user data, e.g., user preferences and user programs. The computer system in some cases can include one or more additional data storage units that are external to the computer system, such as located on a remote server that is in communication with the computer system through an intranet or the Internet.

The computer control system can communicate with one or more remote computer systems through the network. For instance, the computer system can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The computer system may be in digital communication with an electric vehicle, a charging station, or a charging depot. The user can access the computer system via the network.

Methods as described herein may be implemented by way of a cloud computing system. For example, by way of a computer center or data center accessed via a network. The network may be any network described herein. The computer center or data center may comprise any of the computer systems described herein. In some embodiments, the cloud computing system may be a private cloud computing system. For example, the computer center of the private cloud computing system may be owned by an operator of the optimizer system described herein, or the computer center may be owned by a third party and leased or rented to the operator. In some embodiments, the cloud computing system may be a public cloud computing system. For example, the computer center of the public cloud computing system may be open for public use.

Methods as described herein can be implemented by way of machine (e.g., computer processor) executable code stored on an electronic storage location of the computer system, such as, for example, on the memory or electronic storage unit. The machine executable or machine-readable code can be provided in the form of software. During use, the code can be executed by the processor. In some cases, the code can be retrieved from the storage unit and stored on the memory for ready access by the processor. In some situations, the electronic storage unit can be precluded, and machine-executable instructions are stored on memory. The code can be pre-compiled and configured for use with a machine having a processer adapted to execute the code or can be compiled during runtime. The code can be supplied in a programming language that can be selected to enable the code to execute in a pre-compiled or as-compiled fashion.

Aspects of the systems and methods provided herein, such as the computer system, can be embodied in programming Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system can include or be in communication with an electronic display that comprises a user interface (UI). Examples of UI's include, without limitation, a graphical user interface (GUI) and web-based user interface.

Figure 5:
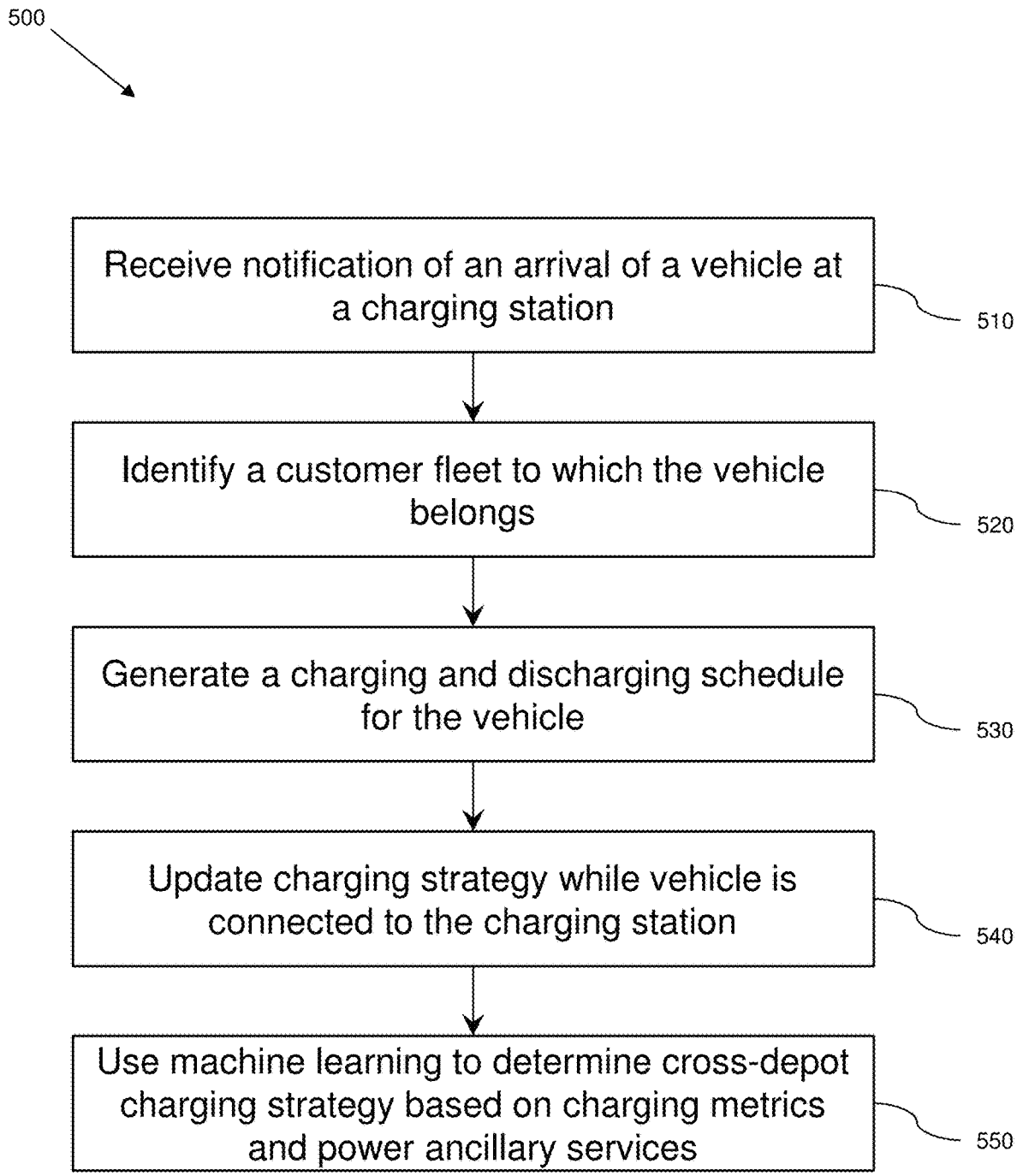
FIG. 5 shows a flow chart illustrating an exemplary process for dynamically varying an electric vehicle charging schedule for an electric vehicle.

FIG. 5 illustrates a method 500 for implementing a fleet-based charging method plan comprising one or more charging schedules (e.g., consumption management plans), and updating one or more charging schedules upon arrival of an electric vehicle at a charging station. At block 510, the optimizer system (e.g., 120) may receive a notification that an electric vehicle (e.g., 151) has arrived at a charging station (e.g., 166). The notification may be sent from the electric vehicle to, for example, the optimizer system or the charging depot (e.g., 165). In some embodiments, the notification may be sent over a network. The electric vehicle may be identified upon arrival at the charging station. The optimizer system may identify a customer or a fleet to which the vehicle belongs at block 520. The customer vehicle fleet may comprise one or more charging metrics. The one or more charging metrics may include number of vehicles, type of vehicles, target state of charge, vehicle duty cycle, vehicle range, vehicle battery size, number and availability of parking stations, power output limits of charging stations, and other parameters. A vehicle duty cycle may include a vehicle use schedule, an arrival time at a charging station, or a duration of stay at the charging station. A charging method plan may be selected or generated based on the identified customer or fleet. In some embodiments, a charging method plan may be based on a first-in, first-out (FIFO) model or fixed schedule charging model. The charging method plan may be a fleet-based charging method plan. For example, the charging method plan may coordinate between a plurality of electric vehicles or a plurality of charging depots. The optimizer system may generate a charging and discharging schedule for the electric vehicle at the charging station at block 530. The charging and discharging schedule may be determined from the charging method plan, for example the fleet-base charging method plan. In some embodiments, the charging and discharging schedule may be determined based on a charging method plan to increase gross contribution, as described with respect to FIG. 3. The charging method plan may be determined to increase gross contribution for a fleet of electric vehicles or for one or more charging depots. The charging method plan may be determined to increase gross contribution for a customer.

The optimizer system can be enabled to prevent or limit the amount of power drawn in power consumption peak periods (e.g., when consumption per kilowatt (or other power amount) exceeds a desired cost, e.g., which can result in what is commonly referred to as a peak demand charge) or in energy cost peak periods (e.g., when consumption per kilowatt hour (or other energy amount) exceeds a desired cost, e.g., which can result in what is commonly referred to as peak period or elevated pricing energy consumption). Thus, the optimizer system can be used to limit the power level metered by the site to avoid peak demand charges or consumption of energy during relatively expensive rate periods for the charging depot site. The optimizer system can do this by controlling the amount of power that a vehicle charger can draw.

Figure 5A:
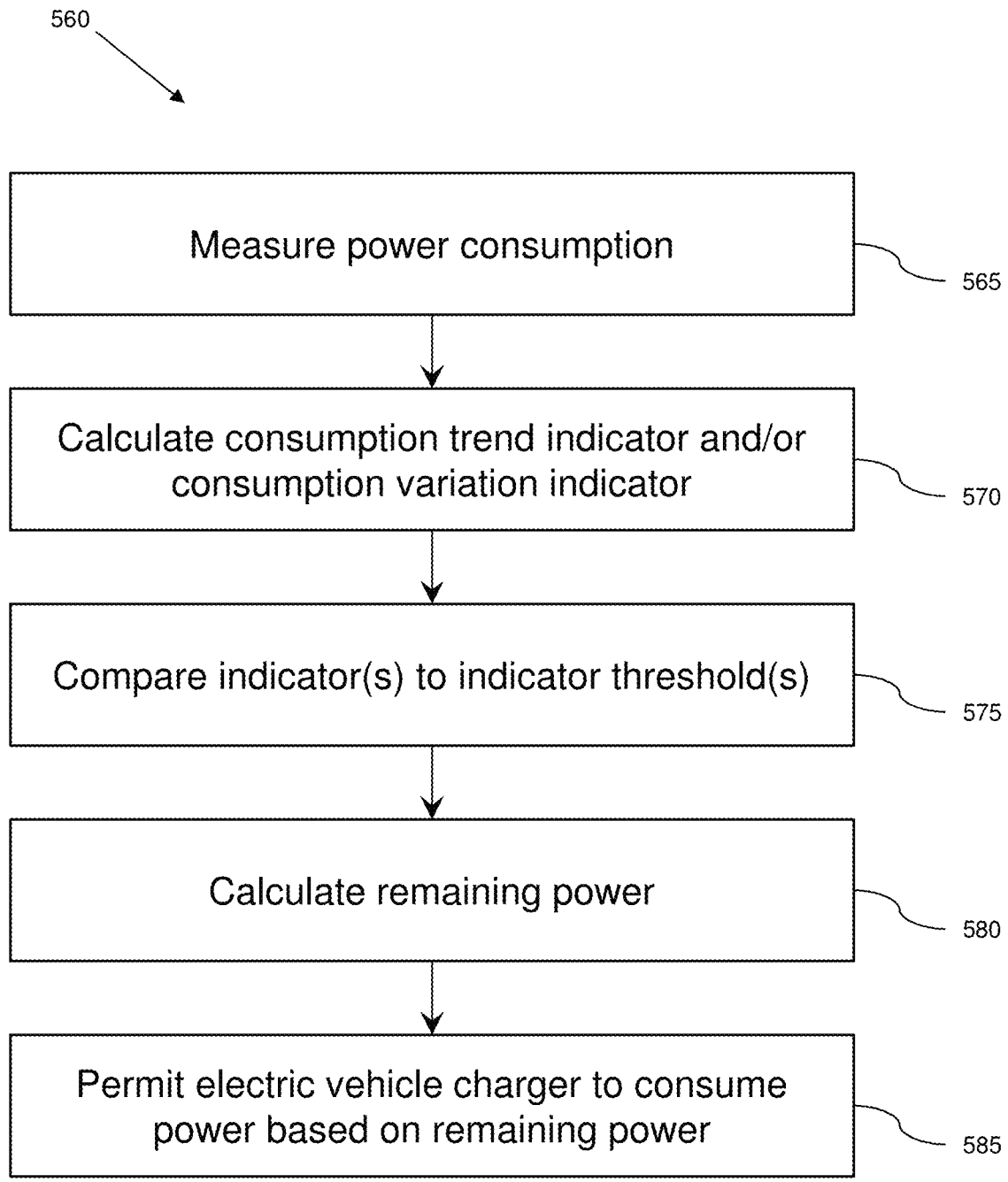
FIG. 5A shows a flow chart illustrating a method for controlling electric vehicle charging based on power consumption at the site.

In some embodiments, a charging method plan or schedule can be implemented based on the total power consumption measured at the site when the notification of the electric vehicle movement to the charging station or its arrival is received by the system or when the electric vehicle requests power from the charging station. An example embodiment of a method 560 for controlling electric vehicle charging is provided in FIG. 5A. The method 560 can include measuring power consumption at a site where the EV charging equipment is located, as indicated in block 565. For example, a meter or power sensor can be used to record the total power consumption of the site over time. Generally, the total power consumption can comprise usage of power by the many types of loads at the site (e.g., monitored, unmonitored, controlled, uncontrolled loads, etc.). In some examples, these types of loads can be heating and cooling loads, appliance loads, EV charger loads, lighting loads, equipment loads (e.g., industrial machines), computer loads, pump loads, and other related loads. This power can be unpredictable and, in some cases, largely unmeasurable. For example, even if an EV charger is instructed to provide 100 kilowatts of power to an EV, its actual output (and consumption of power) can vary from the commanded power output due to error and minor power fluctuations. Additionally, measurement and sensor error can make total power consumption vary from what is measured at an electrical utility meter or other similar site-wide consumption sensor. Thus, under some circumstances, the optimizer system is unable to determine with precision how much power is being consumed by some loads at the site. This also means there can be uncertainty regarding the magnitude of difference between the total measured power consumption (e.g., as consumed at a power meter for the site) and the peak threshold consumption at the site. This magnitude of difference can be referred to as the "available power" that the site can consume at that time without exceeding the peak threshold consumption value of the site. In some embodiments, the available power defines how much power an EV charger can provide to a vehicle at that time without causing the total power to exceed the peak threshold consumption value.

Additionally, although past and current total power consumption for the site can be measured and referenced, if a new load is turned on or an existing load increases its consumption while the EV charger is drawing power equal to the available power, the total power consumption will exceed the peak threshold consumption, thereby triggering excess utility charges. Therefore, a charging method plan of the present disclosure can comprise a method 560 for controlling the electric vehicle charging by detecting conditions in which the vehicle charger is likely or unlikely to trigger excess utility charges (i.e., the EV charger's consumption causes total power consumption to exceed the peak threshold consumption value) and then permitting the EV charger to consume power that is unlikely to cause those excess utility charges.

In some embodiments, the optimizer system can comprise a control system configured to implement code that, upon execution by at least one computer processor, implements a method for controlling electric vehicle charging at a site. The method can include steps to help mitigate the effects of uncertainty and variation in the measurement of available power at the site and the effect of uncontrolled or uncontrollable loads adding to the total power consumption while power is being provided to an EV by an EV charger at the site. In one embodiment, the method can include measuring the total power consumption of the site over time (as shown in block 565), calculating a consumption trend indicator and/or a consumption variation indicator for the total power consumption (as shown in block 570), determining whether the consumption trend indicator is above a trend indicator threshold and/or whether the consumption variation indicator is above a variation indicator threshold (as shown in block 575), and determining a remaining power value (i.e., the amount of available power for the EV charger) based on the relationship between the consumption trend indicator/trend indicator threshold and/or the consumption variation indicator/variation indicator threshold (as shown in block 580). The EV charger can then be permitted to consume power at the site up to the remaining power value, as shown in block 585.

The system can calculate a consumption trend indicator in block 570 by determining a rate of change of power usage over a recent time period. For instance, the rate of change of power usage can be the rate of change of the total power consumption of the site over a certain amount of time (e.g., the preceding about 10 minutes, about 15 minutes, about 30 minutes, about 1 hour, about 2 hours, or another span of time). Thus, the consumption trend indicator can indicate whether the power usage of the site (or a load or subset of loads at the site) is increasing or decreasing over the recent time period and can indicate how quickly the power usage is increasing or decreasing over the recent time period. As a specific example, the consumption trend indicator may mathematically plot the power usage values over the time period and determine if the slope of the power values along in the resulting line or trendline is trending upwards, i.e., positive slope, or trending downwards, i.e., negative slope.

The system can calculate a consumption variation indicator in block 570 by providing a numeric indicator of how differently the power is being consumed during the recent time period as compared to another time period. The consumption variation indicator can comprise an objective, comparative indicator between current/recent consumption (e.g., real-time consumption or consumption over the past about 10-15 minutes) versus historical consumption (e.g., consumption in a time period preceding the real-time consumption measurement (e.g., 10-15 minutes beforehand) or consumption preceding the past about 10-15 minutes (e.g., the past hour)). For instance, the consumption variation indicator can be determined by calculating the standard deviation of the recent time period in which the rate of change of power usage is calculated. The standard deviation of the recent time period can be determined with respect to another span of time (e.g., about the past 10 or 20 minutes, the past hour, the past 2 hours, the past day, or another time period). Accordingly, the consumption variation indicator can quantify how differently the power (in real-time or in the recent time period) is being used as compared to another previous time period (e.g., the recent time period or earlier than the recent time period).

The trend indicator threshold in block 575 can comprise a predetermined threshold value against which the consumption trend indicator is compared by the system, and the variation indicator threshold in block 575 can comprise a predetermined threshold value against which the consumption variation indicator is compared by the system. The trend indicator threshold can, in some embodiments, be a value of zero, wherein the system is configured to determine whether the consumption trend indicator is greater than zero (i.e., has a substantially positive rate of change in the recent time period) or less than zero (i.e., has a substantially negative rate of change in the recent time period). The variation indicator threshold can, in some embodiments, be a value of one, wherein the system is configured to determine whether the consumption variation indicator (e.g., standard deviation in the recent time period) is greater than one or less than one.

When the consumption trend indicator exceeds the trend indicator threshold, such as when the trend indicator is positive and exceeds zero, and/or when the consumption variation indicator exceeds the variation indicator threshold, such as when the variation indicator exceeds one standard deviation, the system can be referred to as being in "up" mode. If these conditions are not met, such as when the consumption trend indicator is negative and/or when the consumption variation indicator is less than one standard deviation, the system can be referred to as being in "down" mode.

While in "up" mode, the system can determine that the power consumption of the site is expected to increase in the near future or is currently increasing, so a remaining power (i.e., available power for charging) value is set by the system in block 580 based on the highest total power consumption measurement in the recent time period. In other words, the system may only allow EV chargers to consume power at a level less than or equal to the difference between the threshold peak consumption value and the recent highest total power consumption measurement. This available power value can be referred to as a first remaining power value or a first available power value. In this manner, the EV charger's power may be controlled to decrease as the highest total power consumption measurement increases, and the EV charger's upper power output is limited to prevent an upcoming peak in consumption (which will include the EV charger's power draw) from exceeding the threshold peak consumption value.

While in "down" mode, the system determines that the power consumption of the site is expected to stay steady or decrease in the near future, so a remaining power (i.e., available power for charging) value is set by the system in block 580 based on the current real-time total power consumption measurement. In other words, the system may allow EV chargers to consume power at a rate less than or equal to the difference between the threshold peak consumption value and the current total power consumption measurement. This available power value can be referred to as a second remaining power value or a second available power value. In this manner, the EV charger's power is permitted to stay steady or increase over time as the total power consumption measurement does not significantly fluctuate (e.g., more than one standard deviation in the recent time period) or declines. The trend and variation indicators increase the confidence of the system that the total power consumption measurement will not be increasing and threatening to cause the total power consumption to exceed the threshold peak consumption value. Thus, there is more "room" in the power consumption of the site for the EV charger to consume power and charge a vehicle more quickly without triggering magnitude-of-consumption-based peak power demand charges.

In some embodiments, as shown in block 585, the method can comprise permitting the EV charger to consume power at the site at a magnitude less than or equal to the first or second remaining power value (i.e., in "up" mode or "down" mode). Furthermore, the method can include providing that amount of power to the EV connected to the EV charger.

Using this charging control method and system can reduce demand-based electric utility charges while allowing vehicles to be charged at a high rate of energy transfer. This can also help control the energy used by controlled chargers in concert with uncontrolled loads at the charging station and can help manage the system with limited power metering (e.g., no power metering is needed on controlled devices such as EV chargers, HVAC, or other significant loads since all control operations are based on total power consumption measurements).

The method 560 can further include providing the power to the EV charger and continuously performing other steps (e.g., as shown in blocks 565 through 585) to control the amount of power provided to the vehicle in real time while the charger is being operated. Thus, changes in power consumption conditions at the site can be detected, accounted for, and counteracted (if needed) before excessive utility demand or overage charges or rates are incurred. In some embodiments, the method 560 can be performed at regular intervals, such as in fractions of a second, about every second, about every 10 seconds, about every 30 seconds, about every minute, etc. Accordingly, the system can be capable of adapting to rapid changes in the total power consumption of the site, such as changes occurring every second, every 10 seconds, every 30 seconds, every minute, etc.

Figure 5B:
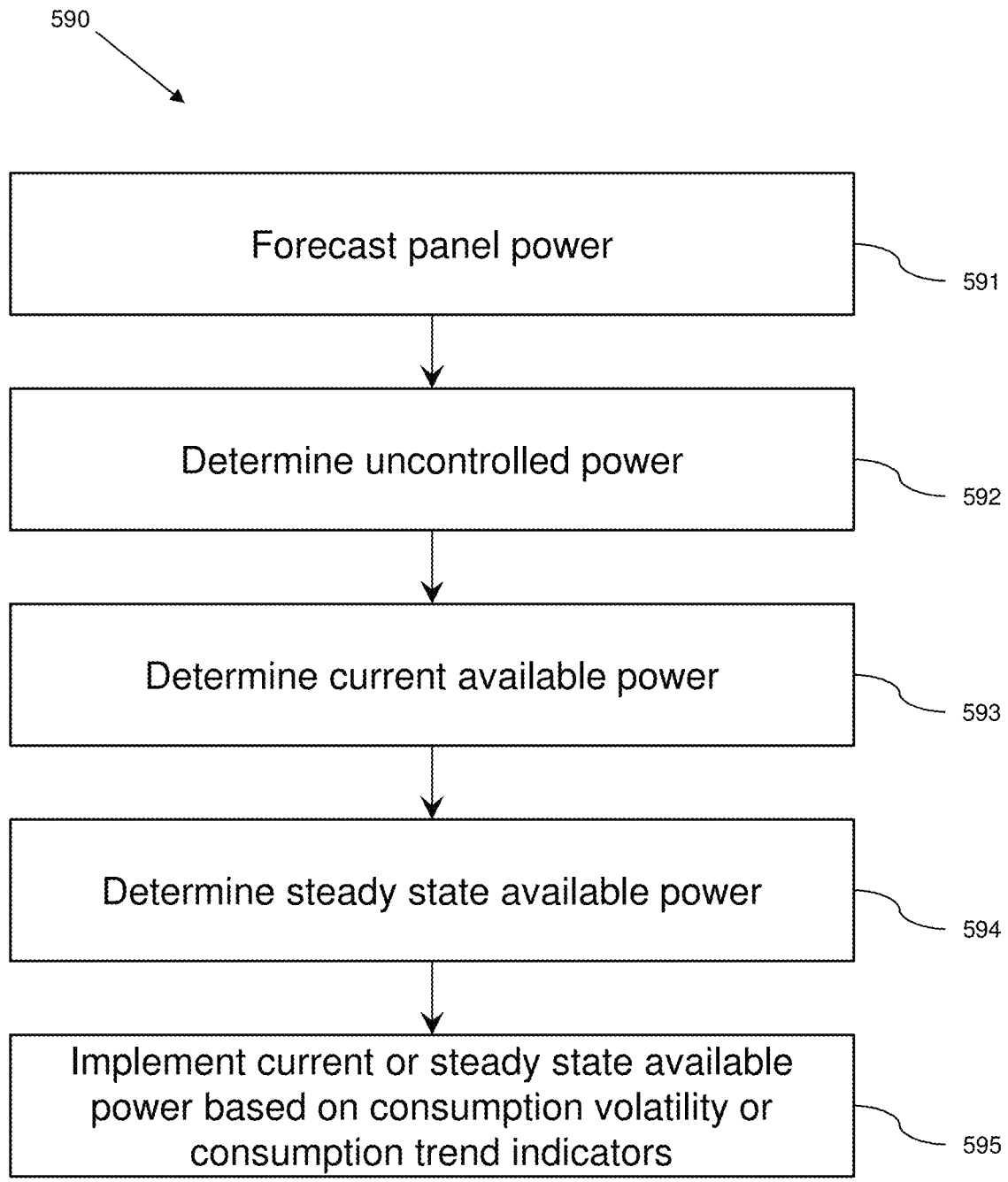
FIG. 5B shows a flow chart illustrating another method for controlling electric vehicle charging based on forecasted and measured power consumption at the site.

FIG. 5B illustrates a related method 590 for controlling power output for one or more EV chargers. In this method 590, the operator can monitor and measure power consumption over time and can model and forecast upcoming panel power draw for an electrical panel serving the chargers, as shown in block 591. The forecasted panel power is a function of a volatility or consumption trend of recent panel power consumption such as the consumption trend indicator and/or consumption variation indicator of block 570. Thus, the forecasted panel power determined in block 591 can comprise a prediction of what amount of power will be consumed by the EV chargers in an upcoming time period.

In block 592, the method 590 can include determining uncontrolled power for the site. The system operator can measure uncontrolled power (e.g., by metering and tracking consumption of various uncontrolled or uncontrollable devices) or can infer the uncontrolled power by comparing the forecasted panel power (from block 591) to the present controlled power (i.e., the power drawn by loads that can be controlled by the system operator). In the latter case, the operator can determine uncontrolled power by finding the difference between the forecasted panel power and the current controlled power, and the difference can represent an estimate of the uncontrolled power since the difference will be the amount of future power consumption that is not part of the controlled loads. In some embodiments, this action can include finding a difference between the forecasted panel power and a forecasted controlled power, wherein the forecasts can be calculated based on historical data, schedules, and similar information about consumption at the site.

In block 593, the method 590 can include determining the current available power. The available power in this block refers to the amount of "headroom" or power capacity of the panel(s) that is available when taking into account the present, up-to-date, and constantly-changing consumption of all controlled and uncontrolled loads at the site. In various embodiments, the capacity or headroom can refer to an upper limit on panel capacity (e.g., the upper power rating for the electrical panel device itself) or a user- or operator-defined upper limit on consumption (e.g., a power level that, if exceeded, causes excess power consumption demand charges). Thus, if the panel is rated for 500 kilowatts and the current controlled and uncontrolled loads are consuming 200 kilowatts, the current available power could be the remaining 300 kilowatts, i.e., the difference between the capacity of the panel and the current consumption, or if demand charges are triggered after 350 kilowatts, the current available power could be the remaining 150 kilowatts between consumption and the demand charge triggering threshold. This available power value can be considered as a candidate for the implemented available power. In other words, the method 590 can allow EV chargers to draw on this "headroom" capacity to provide power to EVs. See block 595 and its description below. Notably, the current available power changes over time based on consumption of the controlled and uncontrolled loads. Therefore, the current available power in block 593 represents the maximum possible power to permit EV chargers to use.

In block 594, the method 590 can include determining a steady state available power level. The available power in this block refers to the amount of "headroom" or power capacity of the panel(s) that is available when taking into account a steady state consumption of controlled and/or uncontrolled loads at the site. Generally, the steady state consumption is the consumption value of the site when power levels are stable and relatively unchanging from one minute to the next. For example, the steady state consumption can be determined as the consumption of the loads as determined over a predetermined period of time while those measured loads have remained within one standard deviation of a larger group of consumption values (e.g., measurements from a preceding time period). In some configurations, the steady state consumption at the site can be determined as a maximum power consumption of the site's uncontrolled and controlled loads in a recent time period (e.g., the highest consumption value measured in the last 2-15 minutes or another recent time span). In some configurations, the steady state consumption can be the an average (or other representative) value of consumption over time as long as the loads stay within a configurable buffer value. For example, the steady state consumption can be the average consumption of the loads over the past 5 minutes provided that the average consumption has not deviated 3 kilowatts or more from that average within those 5 minutes.

With the steady state consumption determined, the steady state available power can be determined as the remaining capacity of the panel (or the amount of power available to use without triggering a demand charge) if the steady state consumption continues into the future. Thus, if the steady state consumption is 200 kilowatts and the demand charge threshold is 300 kilowatts, the steady state available power would be 100 kilowatts. The steady state available power of block 594 is also a candidate for implementation by the system. Thus, the system can be configured to only implement one of the two determined available power values (i.e., only one of the current available power and the steady state available power).

The system can implement whichever available power value will optimally permit power to charge the vehicles while simultaneously minimizing risk of incurring new demand charges. In block 595, the method 590 includes implementing the current or steady state available power values. This can include allowing or instructing EV chargers to consume power up to the current or steady state available power levels. The available power setting implemented can be based on a consumption volatility/variation indicator and/or a consumption trend indicator. As explained above, a variation or volatility indicator can numerically represent the size of swings in consumption over a recent period of time. Thus, the indicator can be a calculated standard deviation of the measured loads over time. A consumption trend indicator can numerically represent whether the consumption is increasing, decreasing, or staying relatively steady over time. Thus, this indicator can be a slope of a trendline of the measured loads over time.

If the loads are in a steady or declining state of consumption, the available power implemented in block 595 can be the steady state available power. If the loads have low volatility and variation (e.g., standard deviation less than one), the available power can be the steady state available power. If, however, the loads are increasing consumption or have high volatility and variation, the available power can be implemented as the current available power. In some embodiments, when current available power is implemented in block 595, a consumption buffer can be built-in to allow for small fluctuations of consumption to not trigger demand charges. Thus, the current available power can be set at the maximum possible value minus the consumption buffer. In this way, increased consumption from loads can be detected, and current available power can be decreased, before consumption exceeds the demand charge threshold or panel power rating.

Using this method 590, the system can increase power output from EV chargers while minimizing risk of incurring demand charges in the process. Furthermore, this method 590 can reduce issues arising from starting and stopping EVSEs or adjusting EV power levels overly frequently by allowing for fluctuations that do not cause EVSE change events (i.e., using the buffer) and by anticipating that EVSE change events will be rare (i.e., when steady state available power mode is implemented).

Certain charging stations can oscillate with respect to the power they dispense at certain power levels. EV chargers can interact unusually with battery management systems when close to completing charging (e.g., when nearing final state of charge (SOC)). For example, different EV buses with different battery management systems can produce power curve oscillations that vary with their different states of charge, such as when they nearly reach full charge, the BMS can turn charging on and off at unpredictable times. Additionally, grid power levels can fluctuate based on power electronics used at certain power levels. These fluctuations and oscillations are relatively unpredictable, but there are patterns at which power levels they occur, and the state of the overall system impacts the patterns. Embodiments of the present disclosure can help mitigate the effects of those fluctuations and oscillations by controlling the power drawn by EV chargers to levels that take into account those changes in consumption and reduce the chance that those fluctuations will drive the total power consumption over the threshold peak consumption value.

The charging schedule may be updated in real time at block 540 while the vehicle is driving, arriving at, or connected to the charging station. See FIG. 5. The charging schedule may be updated one or more times while the electric vehicle is driving, arriving at, or plugged into the charging station. The second charging station may be at the same charging depot or a different charging depot. The charging schedule may be updated when a second electric vehicle is plugged into a second charging station. The second electric vehicle may be from the same fleet or a different fleet. The charging schedule may dynamically choose power levels (e.g., charging rates or discharging rates) between a provisioned power level and a maximum power level. The power levels may be selected to balance additional revenue from ancillary services and additional capacity cost to be paid to a utility company. The charging schedule may be updated when the charging method plan is updated. The charging method plan, for example the fleet-based charging method plan, may be updated in response to a change in state of a vehicle in the fleet or in response to a change in state of a vehicle at a charging depot. The fleet-based charging method plan may coordinate charging schedules between one or more electric vehicles or one or more charging depots at step 550. In some cases, the charging method plan may be determined using machine learning. The charging method plan may be based on charging metrics and power ancillary services.

The charging schedule may be updated anytime when a new event is available to the optimizer. The charging schedule may be updated within 0.1 seconds, within 0.2 seconds, within 0.5 seconds, within 1 second, within 2 seconds, within 3 seconds, within 4 seconds, within 5 seconds, within 10 seconds, within 15 seconds, within 20 seconds, within 30 seconds, within 45 seconds, within 60 seconds, within 2 minutes, within 5 minutes, or within 10 minutes of an availability of a new event. In some embodiments, the charging schedule is updated in response to a change in state of another vehicle in the fleet. The charging schedule may be updated as described with respect to FIG. 2. The charging schedule may be updated one or more times while the electric vehicle is plugged into the charging station. The charging schedule may be updated based on a change in a state of charge of the electric vehicle, a deviation from a nominal state of charge of the electric vehicle, or a deviation from 100% accuracy. A charging method plan may be a fleet-based charging method plan. Charging strategies may be coordinated between a plurality of depots based on power metrics and ancillary services to increase overall gross contribution, as described with respect to FIG. 2 and FIG. 3. The charging schedule may be updated based on one or more charging strategies coordinated between the plurality of depots.

Figure 6:
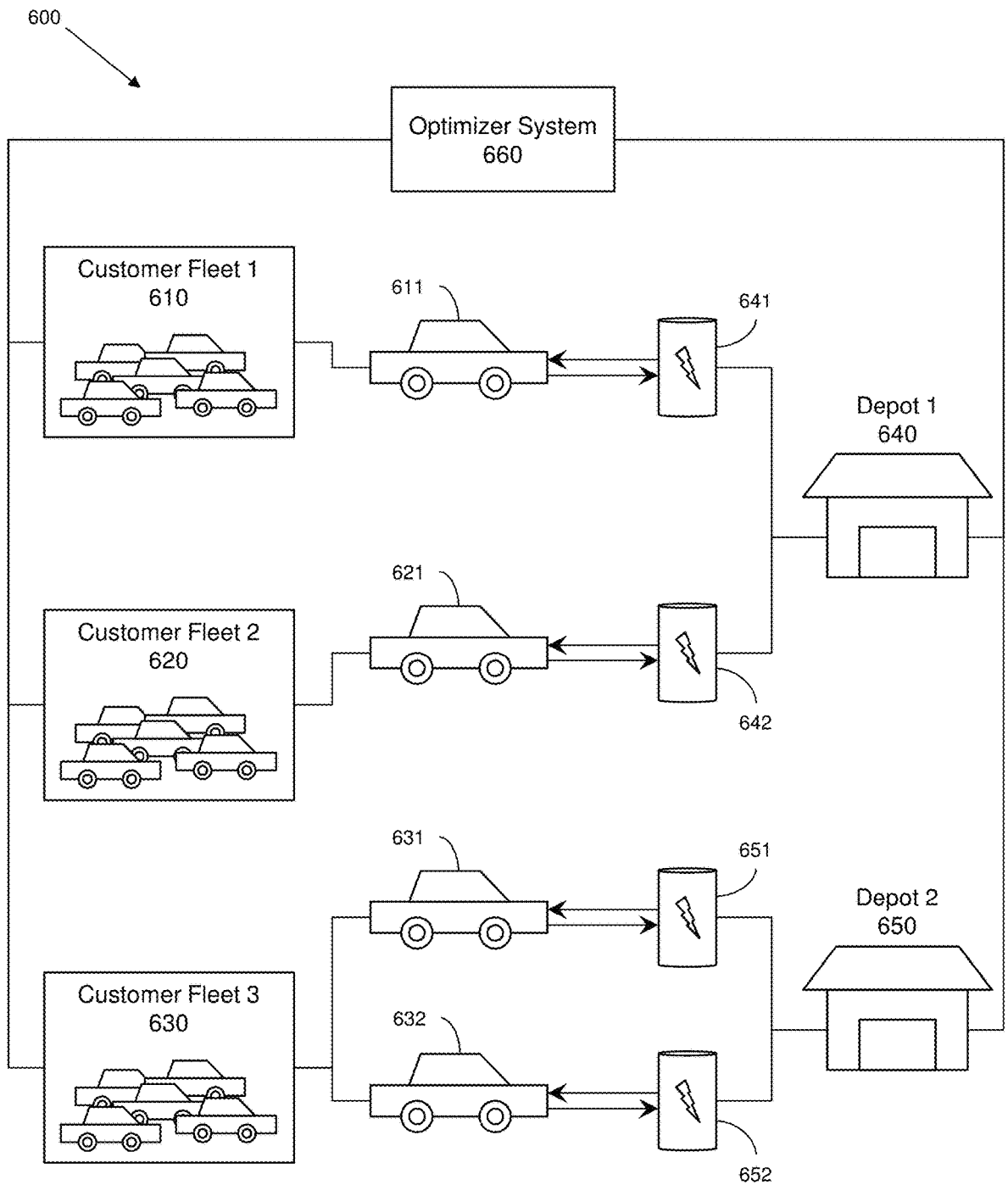
FIG. 6 shows a block diagram illustrating an exemplary system for determining electric vehicle charging strategies across multiple vehicle fleets and multiple charging depots.

FIG. 6 illustrates an optimizer system 600 for determining a plurality of distinct charging schedules based on one or more distinct charging strategies for a plurality of charging depots and a plurality of electric vehicle fleets comprising a plurality of electric vehicles. The one or more distinct charging strategies may comprise one or more fleet-based charging strategies. The one or more fleet-based charging strategies may further comprise a plurality of distinct charging schedules. The optimizer system 660 may determine the plurality of distinct charging schedules using any of the methods described herein, for example, as described with respect to FIG. 1-FIG. 3. The plurality of distinct charging schedules may be updated in real time (e.g., within a fraction of a second, every second, or every several seconds) based on parameters including vehicle parameters, customer-provided parameters, or predicted parameters. The plurality of distinct charging schedules may be updated in real time based on parameters from one or more electric vehicles, one or more fleets, or one or more charging depots. The optimizer system may determine distinct strategies for a first charging depot 640, a second charging depot 650, or more. The distinct charging strategies may comprise a plurality of distinct charging schedules. The first charging depot may comprise a plurality of charging stations, for example, a first charging station 641, a second charging station 642, or more. The second charging depot may comprise a plurality of charging stations, for example, a first charging station 651, a second charging station 652, or more. The plurality of distinct charging schedules may be determined for a plurality of electric vehicle fleets for one or more customers, for example, a first electric vehicle fleet 610, a second electric vehicle fleet 620, and third electric vehicle fleet 630, or more. The first electric vehicle fleet, the second electric vehicle fleet, the third electric vehicle fleet, or more may each comprise a plurality of electric vehicles. In some embodiments, a first electric vehicle 611 from the first electric vehicle fleet may be plugged into the first charging station at the first charging depot; a second electric vehicle 621 from the second electric vehicle fleet may be plugged into the second charging station at the first charging depot; a third electric vehicle 631 from the third electric vehicle fleet may be plugged into the first charging station and the second charging depot; and a fourth electric vehicle 632 from the first electric vehicle fleet may be plugged into the second charging station and the second charging depot. One or more of the distinct charging schedules may be updated while one or more of the electric vehicles from the one or more electric vehicle fleets are plugged into the one more charging stations at the one or more charging depots. The one or more distinct charging strategies may be used to determine one or more charging and discharging schedules for the one or more electric vehicles plugged into the one or more charging stations. The plurality of distinct charging strategies may be coordinated between or more electric vehicles, one or more fleets, or one or more charging depots. The plurality of distinct charging strategies may be determined to fit the distinct needs of one or more customers, for example, desired electric vehicle response time, predicted duration of stay of an electric vehicle at a charging station, or desired revenue from vehicle to grid charging.

The optimizer system may determine the plurality of distinct charging strategies for management of large electric vehicle fleets or one or more charging depots. In some embodiments, the charging strategies may be improved to lower costs associated with electric vehicle charging. In some embodiments, the charging strategies may be determined for increased energy grid stabilization. The charging strategies may be coordinated between one or more electric vehicles, one or more electric vehicle fleets, or one or more charging depots. A distinct charging method plan may be implemented when a vehicle is plugged into a charging station. The vehicle may be identified when it is plugged into a charging station. The customer or fleet to which the vehicle belongs may be identified. The charging method plan may be identified based on the appropriate customer or fleet to which the vehicle belongs. A charging schedule for the electric vehicle may be determined based on the identified charging method plan. The charging schedule may be updated using any of the methods described herein.

The plurality of distinct charging strategies may be determined for one or more customers. In some embodiment, the plurality of distinct charging strategies are determined for at least one customer, at least 2 customers, at least 5 customers, at least 10 customers, at least 20 customers, at least 30 customers, at least 40 customers, at least 50 customers, at least 75 customers, at least 100 customers, at least 200 customers, at least 300 customers, at least 400 customers, at least 500 customers, or more customers. In some embodiment, the plurality of distinct charging strategies are determined for at least one electric vehicle fleet, at least 2 electric vehicle fleets, at least 5 electric vehicle fleets, at least 10 electric vehicle fleets, at least 20 electric vehicle fleets, at least 30 electric vehicle fleets, at least 40 electric vehicle fleets, at least 50 electric vehicle fleets, at least 75 electric vehicle fleets, at least 100 electric vehicle fleets, at least 200 electric vehicle fleets, at least 300 electric vehicle fleets, at least 400 electric vehicle fleets, at least 500 electric vehicle fleets, or more electric vehicle fleets. The electric vehicle fleets may be owned by one or more customers. In some embodiment, the plurality of distinct charging strategies are determined for at least one charging depot, at least 2 charging depots, at least 5 charging depots, at least 10 charging depots, at least 20 charging depots, at least 30 charging depots, at least 40 charging depots, at least 50 charging depots, at least 75 charging depots, at least 100 charging depots, at least 200 charging depots, at least 300 charging depots, at least 400 charging depots, at least 500 charging depots, or more charging depots. In some embodiment, the plurality of distinct charging strategies are determined for at least 5 electric vehicles, at least 10 electric vehicles, at least 25 electric vehicles, at least 50 electric vehicles, at least 100 electric vehicles, at least 200 electric vehicles, at least 500 electric vehicles, at least 750 electric vehicles, at least 1000 electric vehicles, at least 1500 electric vehicles, at least 2000 electric vehicles, at least 3000 electric vehicles, at least 5000 electric vehicles, or more electric vehicles. The electric vehicles may belong to one or more electric vehicle fleets.

Figure 7:
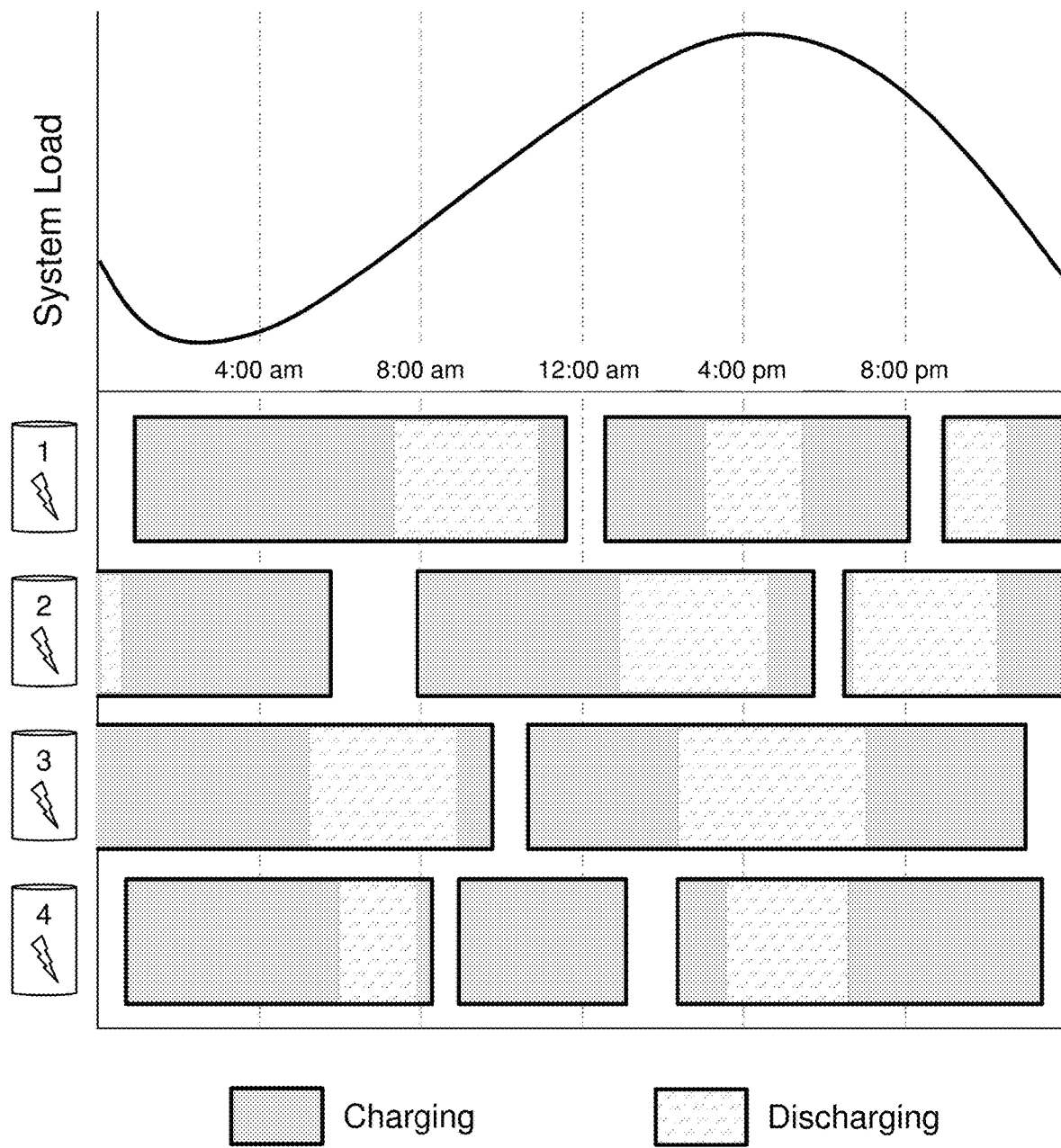
FIG. 7 shows a diagram of exemplary charging schedules for multiple electric vehicles at multiple charging stations based on an automatic generation control signal indicating system load.

FIG. 7 illustrates exemplary charging and discharging schedules for a plurality of electric vehicles plugged into a plurality of charging stations. In some embodiments, a charging schedule is determined when an electric vehicle is plugged into a charging station, for example charging station 1. The charging schedule may be updated based on an arrival time of the electric vehicle to the charging station. The charging schedule may be based on a charging method plan. The charging schedule may be coordinated between one or more electric vehicles, one or more fleets, or one or more charging depots. The charging schedule may comprise periods of charging when the electric vehicle is receiving power from the charging station, and periods of discharging when the electric vehicle is providing power to ancillary service providers. The charging schedule may be updated based on an AGC signal indicating a system load. The system load may depend on energy demand. For example, a system load may be higher at 4:00 pm than at 4:00 am. In some embodiments, an electric vehicle charging schedule may instruct the electric vehicle to charge during periods of low system load and discharge during periods of high system load. In some embodiments, durations of periods of charging and periods of discharging may be updated based on a predicated duration of stay at the charging station, a target state of charge when leaving the charging station, or a state of charge nominal trajectory. The charging schedule may be determined based on an anticipated duration of stay at the charging station. A fast-response vehicle that may be requested to enter service on short notice may undergo rapid charging or maintain a high state of charge while connected to the charging station. A fast-response vehicle may maintain a high state of charge so that it may enter service on short notice. For example, a ride-sharing vehicle may be a fast-response vehicle. A slow-response vehicle that may be idle for long periods of time may charge slowly or discharge while connected to the charging station. A slow-response vehicle may discharge during periods of high system load to increase revenue from vehicle to grid charging and may charge slowly during periods of low system load to decrease power costs. For example, a commuter vehicle that is parked for large periods of time may be a slow-response vehicle. Charging schedules and charging strategies may be coordinated between one or more fleets comprising any combination of slow-response or fast-response vehicles. The charging schedules and charging strategies may be designed to achieve customer-specific needs, for example, desired vehicle response times, increased revenue from vehicle to grid charging, or decreased power costs.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A method, comprising:
   receiving, from an electric vehicle, a notification of an arrival at an electric vehicle charging station;
   determining, from the notification, a vehicle fleet indicator corresponding to the electric vehicle;
   generating a charging schedule and a discharging schedule for the electric vehicle based on the vehicle fleet indicator;
   transmitting a signal to at least one of the electric vehicle or the electric vehicle charging station, the signal comprising computer-executable instructions to control power draw for the electric vehicle based on the charging schedule and the discharging schedule; and
   updating at least one of the charging schedule or the discharging schedule while the electric vehicle is connected to the electric vehicle charging station.

2. The method of claim 1, wherein the vehicle fleet indicator includes a charging metric.

3. The method of claim 2, wherein the charging metric includes at least one of: a target state of charge, a vehicle duty cycle, a vehicle range, and a vehicle battery size.

4. The method of claim 1, wherein generating the charging schedule and the discharging schedule comprises identifying a fleet-based charging plan for a fleet of vehicles.

5. The method of claim 1, wherein generating the charging schedule and the discharging schedule comprises using a machine learning model to predict one or more parameters across multiple charging depots, each charging depot including a plurality of electric vehicle charging stations.

6. The method of claim 5, wherein the one or more parameters include at least one of: a charging metric, a power ancillary service metric, or an environmental variable.

7. The method of claim 1, wherein updating at least one of the charging schedule or the discharging schedule comprises receiving a parameter from either the electric vehicle or the electric vehicle charging station while the electric vehicle is connected to the electric vehicle charging station, the parameter comprising at least one of: a state of charge, a rate of charge, a target state of charge, or a predicted duration at the electric vehicle charging station.

8. A method, comprising:
receiving an automatic generation control (AGC) signal indicating a load state of an electrical grid;
generating a charging schedule and a discharging schedule for an electric vehicle based on the AGC signal; and
transmitting a signal to at least one of the electric vehicle or an electric vehicle charging station, the signal comprising computer-executable instructions to control power draw for the electric vehicle based on the charging schedule and the discharging schedule.

9. The method of claim 8, wherein the AGC signal is a predicted signal output by a machine learning model.

10. The method of claim 8, wherein the charging schedule and the discharging schedule indicate that the electric vehicle is to charge during periods of lower electrical grid load and to discharge during periods of higher electrical grid load.

11. The method of claim 8, wherein the electric vehicle is part of a fast-response vehicle fleet.

12. The method of claim 11, wherein the fast-response vehicle fleet includes electric vehicles that have rapid charging privileges and high charge state privileges while connected to the electric vehicle charging station.

13. The method of claim 8, wherein the electric vehicle is part of a slow-response vehicle fleet.

14. The method of claim 13, wherein the slow-response vehicle fleet includes electric vehicles that charge comparatively slower than electric vehicles in a fast-response vehicle fleet or that discharge during periods of higher electrical grid load.

15. The method of claim 8, wherein, during a given time period, the electric vehicle at a first electric vehicle charging station is configured to charge and an additional electric vehicle at a second electric vehicle charging station is configured to discharge, and wherein the first electric vehicle charging station and the second electrical vehicle charging station are part of a same charging depot.

16. A method, comprising:
identifying, for a first charging depot, an arrival of a first electric vehicle at a first electric vehicle charging station, the first electric vehicle having a first vehicle fleet indicator;
identifying, for a second charging depot, an arrival of a second electric vehicle at a second electric vehicle charging station, the second electric vehicle having a second vehicle fleet indicator;
identifying a first charging parameter from the first vehicle fleet indicator and a second charging parameter from the second vehicle fleet indicator;
generating a first plurality of charging schedules and discharging schedules for the first charging depot based on the first charging parameter and based on the second charging parameter;
generating a second plurality of charging schedules and discharging schedules for the second charging depot based on the first charging parameter and based on the second charging parameter;
transmitting a first signal to at least one of the first electric vehicle or the first electric vehicle charging station, the first signal comprising computer-executable instructions to control power draw for at least the first electric vehicle based on the first plurality of charging schedules and discharging schedules; and
transmitting a second signal to at least one of the second electric vehicle or the second electric vehicle charging station, the second signal comprising computer-executable instructions to control power draw for at least the second electric vehicle based on the second plurality of charging schedules and discharging schedules.

17. The method of claim 16, further comprising receiving an automatic generation control (AGC) signal indicating a load state of an electrical grid.

18. The method of claim 17, wherein generating the first plurality of charging schedules and discharging schedules and the second plurality of charging schedules and discharging schedules is subject to the AGC signal.

19. The method of claim 16, wherein each of the first vehicle fleet indicator and the second vehicle fleet indicator indicates at least one of: a first vehicle fleet or a second vehicle fleet that differs from the first vehicle fleet.

20. The method of claim 19, wherein the first electric vehicle is among a first plurality of electric vehicles at the first charging depot, the first plurality of electric vehicles including electric vehicles from both of the first vehicle fleet and the second vehicle fleet.

\* \* \* \* \*